United States Patent [19]
Austin et al.

[11] Patent Number: 5,319,289
[45] Date of Patent: Jun. 7, 1994

[54] ADAPTIVE COMMUTATION DELAY FOR MULTI-POLE BRUSHLESS DC MOTORS

[75] Inventors: Charles C. Austin, Mission Viejo; Bertram J. White, Irvine, both of Calif.

[73] Assignee: Silicon Systems, Inc., Tustin, Calif.

[21] Appl. No.: 840,440

[22] Filed: Feb. 24, 1992

[51] Int. Cl.⁵ ............................................... H02P 6/02
[52] U.S. Cl. ................................................... 318/254
[58] Field of Search ............... 318/138, 254, 439, 445, 318/459, 484, 561, 661, 671

[56] References Cited

U.S. PATENT DOCUMENTS

| | | | |
|---|---|---|---|
| 4,442,386 | 4/1984 | Uchida et al. | 318/254 |
| 4,551,708 | 11/1985 | Welburn | 318/661 X |
| 4,633,150 | 12/1986 | Inaji et al. | 318/254 |
| 4,686,437 | 8/1987 | Langley et al. | 318/254 |
| 5,019,756 | 5/1991 | Schwarz | 318/254 |
| 5,028,852 | 7/1991 | Dunfield | 318/254 |

Primary Examiner—Bentsu Ro
Attorney, Agent, or Firm—Hecker & Harriman

[57] ABSTRACT

A circuit to provide adaptive commutation delay for multi-pole brushless DC motors. The circuit adjusts the commutation delay as a function of the rotational speed of the motor to maximize motor torque and minimize power consumption. Unlike the prior art, the circuit avoids the need for complex circuitry or external components. The circuit may be implemented entirely within a single integrated circuit. The circuit includes a back-EMF sensing input, an oscillator, a voltage holding and proportioning circuit, one or more comparators and, optionally, an external control circuit. The back-EMF sensing input controls the operation of the oscillator. The voltage holding and proportioning circuit processes the oscillator output and provides outputs which are compared by the comparators. The comparators produce commutation delay signals and, optionally, other signals. The circuit also allows adjustment to compensate for non-ideal back-EMF-to-rotor-position correspondence or fixed time delays inherent in the commutation process.

56 Claims, 8 Drawing Sheets

ADAPTIVE COMMUTATION DELAY FOR MULTI-POLE BRUSHLESS DC MOTORS

BACKGROUND OF THE INVENTION

1. Field of the Invention

This invention relates generally to the field of electric motor controllers and, in particular, to optimizing the commutation delay of multipole brushless DC motors.

2. Background Art

The control and operation of multi-pole brushless DC motors that do not contain Hall effect position sensors requires position sensing via the back-EMF signals from the motor. Multi-pole motors are activated by sequentially energizing and de-energizing the windings. This process is commonly referred to as commutation. As the motor rotor moves, it generates voltages across the windings that are referred to as back-EMF (back electromotive force). The magnitude of the back-EMF signal from the motor winding not presently being activated is compared to a reference voltage in order to determine when to change the activation of the motor windings (perform commutation) to effect rotation. The point in time when the back-EMF crosses the reference is not the optimum time at which to commutate to the next coil activation state, but is earlier than the optimum time. Commutation at the optimum time is desirable because it maximizes motor torque and minimizes power consumption for a given rotational speed. When the motor is to be operated at a constant speed, optimum commutation can be achieved with a fixed time delay. However, if the motor is varying its speed (e.g., during acceleration), the amount of delay required is a variable. A method for generating the appropriate amount of variable delay is needed.

In the prior art, the period measurement and subsequent period division has sometimes been performed in a digital manner using counter/timers. This approach, however, requires significant circuitry to provide adequate time resolution.

Another method used in the prior art for period measurement and division involves analog circuitry which charges and discharges a multiplicity of capacitors. The analog method of the prior art requires several external components that are typically not included as part of an integrated circuit. These external components increase the complexity of the circuit and the amount of space that the circuit occupies on a circuit board. By increasing the complexity of the circuit, the reliability of the circuit is compromised.

SUMMARY OF THE PRESENT INVENTION

The present invention provides a circuit for generating a delay in the change of commutation states of a multi-pole brushless DC motor, optimizing the motor's performance. Since the present invention is not based on digital circuitry, it avoids the complexity associated with the digital methods of the prior art. By allowing the incorporation of all necessary components into a single integrated circuit, the present invention also avoids the additional cost and complexity associated with the prior art analog methods. The present invention provides an additional improvement over the prior art by increasing the immunity to spurious signals which lead to faulty motor operation.

In the present invention, back-EMF signals originating in the motor windings are applied to a timing circuit. The timing circuit measures the duration of each commutation state. A memory and proportioning circuit stores values which are a function of the duration of each commutation state and produces outputs that represent fractions of the duration of a commutation state or which represent fractions of the amount of time elapsed since the occurrence of the last back-EMF signal. (As used in this description and in the appended claims, the word "fraction" refers to any value, whether less than, equal to or greater than one, which may be expressed using a numerator and denominator.) Comparators then compare the outputs of the timing circuit or of the memory and proportioning circuit which represent fractions of the amount of time elapsed since the occurrence of the last back-EMF signal to the outputs of the memory and proportioning circuit which represent fractions of the stored duration. Thus, the comparators are used to determine when the real-time duration of the current commutation state approaches a specified fraction of the duration stored by the memory device. The rotational inertia of a rotating motor and load results in very little variation in the duration of adjacent commutation states. Thus, the stored duration of the previous commutation state serves as an accurate prediction of the duration of the current commutation state. Therefore, the present invention allows events to occur after proportional amounts of time into the present commutation state. By keeping these amounts of time proportional to the predicted duration of each commutation state, which is inversely proportional to the rotational speed of the motor, the present invention can provide delays that are adaptive to variations in the rotational speed of the motor.

In the preferred embodiment of the present invention, the commutation delay is adapted to the rotational speed of the motor. A back-EMF signal derived from the motor windings is used to trigger a sawtooth oscillator. The parameters of the sawtooth oscillator may or may not be adjusted by circuitry external to the integrated circuit. The output from the sawtooth oscillator is stored by a track-and-hold circuit. The output of the track-and-hold circuit is applied to a voltage divider which proportionally reduces the voltage from the track-and-hold circuit. The proportionally reduced voltage outputs of the voltage divider are applied as inputs to comparators. The opposite inputs of the comparators are coupled to the output of the sawtooth oscillator.

The back-EMF signal from the motor windings defines particular instants in time representing particular angular positions of the motor rotor. When triggered by the back-EMF signal at these instants in time, the sawtooth oscillator begins to produce a voltage that increases linearly over time. Since the motor rotor has mass, and exhibits rotational inertia, it cannot significantly change speed instantaneously. The motor rotor's inertia keeps it rotating at substantially uniform velocities over short periods of time, so the increasing voltage present at the output of the sawtooth oscillator is proportional both to time and to the angular position of the motor rotor. The track-and-hold circuit stores the voltage present at the output of the sawtooth oscillator when the next back-EMF trigger event occurs. This value represents the amount of time between the sensing of the back-EMF signal of one commutation state and the subsequent back-EMF signal of the next commutation state. The voltage divider produces proportionally reduced voltages which represent amounts of time proportional to the duration stored by the track-and-hold circuit. Since the rotational speed of the motor is relatively uniform over a single commutation state period, these proportional amounts of time represent proportional amounts of rotation of the motor rotor. The comparators compare the proportional voltage outputs of the voltage divider to the output of the sawtooth oscillator. When the amount of time since the back-EMF detection, represented by the output of the sawtooth oscillator, exceeds the specified fraction of the duration of the previous commutation state, represented by the outputs of the voltage divider, the outputs of the comparators change. Thus, the outputs of the comparators provide delays which adapt to variations in the rotational speed of the motor and closely represent fixed angular positions of the rotor regardless of rotational speed.

Since the present invention provides commutation delay for multi-pole brushless DC motors which is adaptive to variations in the rotational speed of the motor without the need for complicated circuitry or components external to a single integrated circuit, a much more efficient, reliable and economical method of providing adaptive commutation delay has been provided.

DETAILED DESCRIPTION OF THE PRESENT INVENTION

A circuit for providing commutation delay for multi-pole brushless DC motors which is adaptive to variations in the rotational speeds of the motors is described. In the following description, numerous specific details, such as the use of CMOS technology, fabrication of the invention on an integrated circuit, the use of buffer amplifiers, the values of capacitors and resistors, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

As used in this description and in the appended claims, the phrase "back-EMF sensing input" or "back-EMF sense input" refers to circuitry for receiving and conditioning back-EMF signals.

Prior art methods have been developed to provide adaptive commutation delays, but these methods are more complicated than the present invention. One method used by the prior art to perform the period measurement and subsequent period division involved the use of digital circuitry, such as counter/timers. In another prior art method, the period measurement and division is achieved in an analog manner by charging and discharging a multiplicity of capacitors.

There are a number of disadvantages associated with the methods of the prior art. Digital period measurement and subsequent period division using circuits such as counter/timers requires significant circuitry to achieve good time resolution. Analog period measurement and division based upon the charging and discharging of a multiplicity of capacitors requires several components that are difficult to fabricate in the form of an integrated circuit. If all necessary components cannot be included in a single integrated circuit, other components external to the integrated circuit must be connected. The addition of external components increases the amount of space occupied on a printed circuit board and the cost and complexity of the circuit, as well as decreasing the reliability of the circuit.

Figure 1:
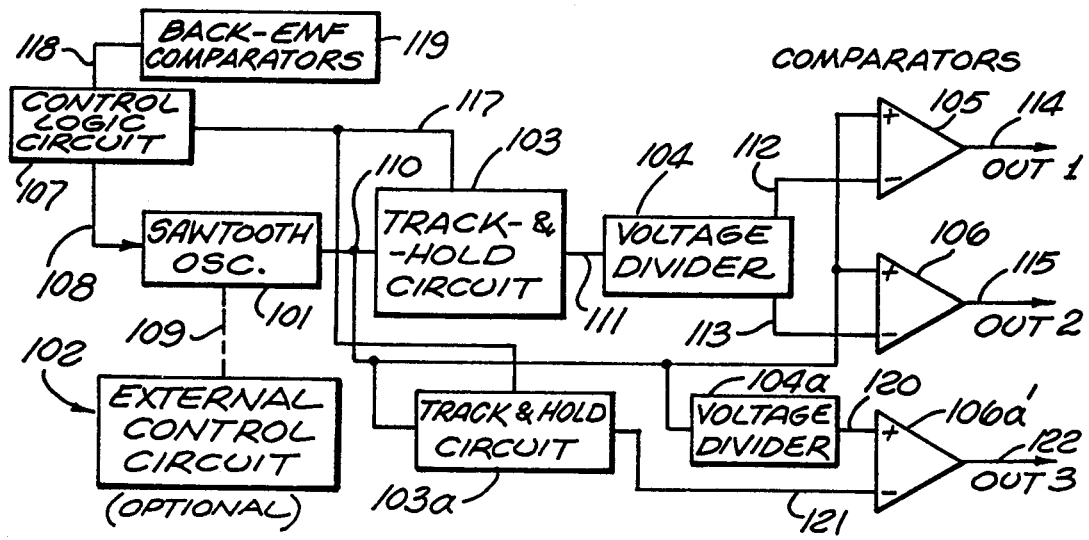
FIG. 1 is a block diagram illustrating the preferred embodiment of the present invention.

A block diagram of the preferred embodiment of the present invention is illustrated in FIG. 1. In this embodiment, back-EMF comparators 119 provide signal 118 to control logic circuit 107. Control logic circuit 107 controls the operation of a sawtooth oscillator 101 (via control signal 108) and track-and-hold circuits 103 and 103A (via control signal 117). Sawtooth oscillator 101 produces a ramp output at coupling 110 where the voltage is a linear function of time. Sawtooth oscillator 101 may be adjusted by an optional external control circuit 102 through coupling 109. Two track-and-hold circuits are provided, 103 and 103A, which operate in alternate fashion. By the action of control signal 117, 103 is tracking (that is, following the voltage Vt at node 110) when 103A is holding, or 103 is holding when 103A is tracking. Typically, a cycle of operation results in a sawtooth waveform at node 110 due to the action of control signal 108. The output of track-and-hold circuit 103 is applied to voltage divider 104 through coupling 111. Voltage divider 104 produces proportionally reduced output voltages at coupling 112 and 113. These proportionally reduced output voltages represent fractions of the duration of the previous cycle. The output of sawtooth oscillator 101, which represents the fraction of the current cycle which has elapsed, is applied, along with the outputs of voltage divider 104, to the inputs of comparators 105 and 106. When the input from sawtooth oscillator 101 reaches a value greater than that produced by voltage divider 104, the outputs of this circuit at couplings 114 and 115 change state. The voltage Vt at node 110 is applied to the voltage divider 104A, and output 120 of voltage divider 104A is applied to comparator 106A along with output 121 of track-and-hold circuit 103A. Comparator 106A changes state when the voltage from voltage divider 104A exceeds the voltage from track-and-hold circuit 103A.

Since the present invention does not require complicated digital circuitry to perform its function, the complexity of the digital methods of the prior art are avoided. With the present invention, all components may be placed on a single integrated circuit, or provisions may be made for a timing component to be left off of the integrated circuit to allow the applicability of the present invention over the widest possible range of motor applications. Since the present invention may be implemented entirely on a single integrated circuit, the size, cost and complexity of the analog methods of the prior art are avoided.

Figure 2:
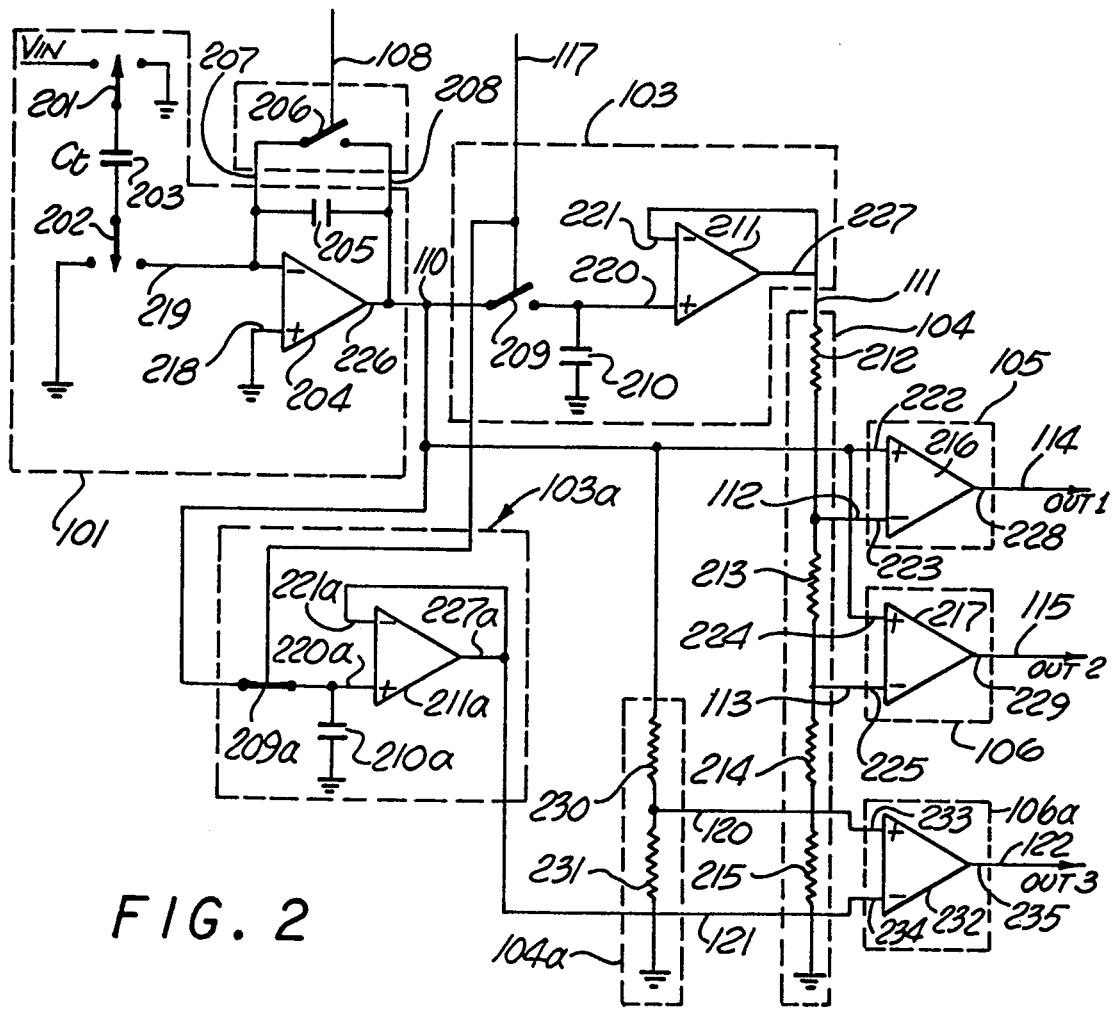
FIG. 2 is a schematic diagram illustrating the preferred embodiment of the present invention.

A detailed schematic of the preferred embodiment of the present invention is illustrated in FIG. 2. In the preferred embodiment, the sawtooth oscillator block 101 is implemented with switches 201, 202 and 206, capacitor 203, operational amplifier 204 and capacitor 205. The first terminal of switch 201 is coupled to the voltage $V_{in}$. The second terminal of switch 201 is coupled to ground. The base terminal of switch 201 is coupled to the first terminal of capacitor 203. The second terminal of capacitor 203 is coupled to the base terminal of switch 202. The first terminal of switch 202 is coupled to ground. The second terminal of switch 202 is coupled to inverting input 219 of operational amplifier 204. The non-inverting input 218 of operational amplifier 204 is coupled to ground. The first terminal of capacitor 205 is coupled to inverting 219 input of operational amplifier 204, and to the first terminal of switch 206. The second terminal of capacitor 205 is coupled to output 226 of operational amplifier 204, and to the second terminal of switch 206. Switches 201 and 202 operate together as a DPDT switch. Switch 206 is coupled to control signal 108.

In the preferred embodiment of the present invention, track-and-hold circuit block 103 is implemented with switch 209, capacitor 210 and operational amplifier 211. The first terminal of switch 209 is coupled to coupling 110. The second terminal of switch 209 is coupled to the first terminal of capacitor 210 and non-inverting input 220 of operational amplifier 211. The second terminal of capacitor 210 is coupled to ground. Inverting input 221 of operational amplifier 211 is coupled to output 227 of operational amplifier 211 and to coupling 111. Switch 209 is coupled to control signal 117.

Voltage divider block 104 is implemented in the preferred embodiment of the present invention with resistors 212, 213, 214 and 215. The first terminal of resistor 212 is coupled to coupling 111. The second terminal of resistor 212 is coupled to the first terminal of resistor 213 and to coupling 112. The second terminal of resistor 213 is coupled to the first terminal of resistor 214 and to coupling 113. The second terminal of resistor 214 is coupled to the first terminal of resistor 215. The second terminal of resistor 215 is coupled to ground.

Upper comparator block 105 is implemented with comparator 216. Non-inverting input 222 of comparator 216 is coupled to coupling 110. Inverting input 223 of comparator 216 is coupled to coupling 112. Output 228 of comparator 216 is coupled to coupling 114.

Lower comparator block 106 is implemented with comparator 217. Non-inverting input 224 of comparator 217 is coupled to coupling 110. Inverting input 225 of comparator 217 is coupled to coupling 113. Output 229 of comparator 217 is coupled to coupling 115.

Track-and-hold circuit 103A is comprised of switch 209A, operational amplifier 211A and capacitor 210A. One terminal of switch 209A is coupled to output 110 from oscillator block 101. The other terminal of switch 209A is coupled to non-inverting input 220A of operational amplifier 211A and to the first terminal of capacitor 210A. The second terminal of capacitor 210A is coupled to ground. Switch 209A is controlled by the control signal 117 of control logic circuit block 107. Output 227A of operational amplifier 211A is coupled in a feedback loop to its own inverting input 221A and to inverting input 234 of comparator 232 of comparator block 106A.

Voltage divider 104A consists of resistors 230 and 231. Signal 110 from sawtooth oscillator block 101 is coupled through resistors 230 and 231 to ground. Output 120 of voltage divider 104A is taken from the junction of resistors 230 and 231 and is provided to non-inverting input 233 of comparator 232 of comparator block 106A. Comparator 232 provides output 235, which is coupled to coupling 122.

Control logic circuit 107 controls the operation of switch 206 (via control signal 108). Back-EMF comparators 119 receive input from the motor coils and the commutation state counter, and provide signal 118 to control logic circuit 107 based on the back electromotive force (back-EMF) present at an unenergized motor winding terminal. Control logic circuit 107 provides control signal 108 to switch 206, and control signal 117 to switches 209 and 209A, based on the sensed back-EMF and the current commutation state. Possible methods of sensing and generating a commutation signal based upon back-EMF are described in U.S. patent application Ser. No. 7/610,103 filed on Nov. 7, 1990, entitled "Bipolar/Unipolar Drive Back-EMF Commutation Sensing System," and U.S. patent application Ser. No. 7/411,712 filed Sep. 25, 1989, entitled "Self-Commutating, Back-EMF Sensing, Brushless DC Motor Controller." Both of these applications are assigned to the Assignee of the present application, and are incorporated herein by this reference.

In the preferred embodiment of the present invention, sawtooth oscillator block 101 is implemented with a switched capacitor current source and an operational amplifier integrator. The switched capacitor current source uses switches 201 and 202 to charge and discharge capacitor 203. Since capacitor 205 is in the feedback path of operational amplifier 204, operational amplifier 204 functions as an integrator. Switches 201 and 202 operate simultaneously as a DPDT switch. That is, switches 201 and 202 are either both closed on their respective first terminals ($V_{in}$ and ground) or their respective second terminals (ground and terminal 219). When the switches are closed on the first terminals, capacitor 203 is charged to voltage $V_{in}$. When the switches are closed on the second terminals, driving capacitor 203 discharges the integrator circuit negatively so that operational amplifier 204 integrates positively. If switches 201 and 202 are operated at a continuous frequency, the amount of charge per unit time, also known as the current, passed to the input of the integrator circuit based on operational amplifier 204 is constant over time. With the input current constant over time, the output of the integrator will be a voltage which increases linearly over time. The rate at which the integrator output increases is determined by the ratio of the value of capacitor 205 to the value of capacitor 203, the rate at which switches 201 and 202 are operated, and the voltage $V_{in}$. The rate at which switches 201 and 202 are operated is referred to as the clock frequency, or $f_c$, of the switched capacitor current source. Note that both the ratio of capacitor values and the clock frequency can be accurately controlled and hence the integrator characteristics are well determined.

The point at which the integration cycle begins is determined by the control signals 108 and 117 from control logic block 107. Switch 206 closes, shorting capacitor 205 and completely discharging it. Then switch 206 is opened, and capacitor 205 begins to charge. The voltage across capacitor 205 forms a "stair step" ramp with a voltage proportional to the time elapsed since switch 206 opened. The rate of $f_c$ is much greater than the rate of operation of switch 206.

Before output 226 of operational amplifier 204 reaches its maximum value at the completion of the integration cycle and switch 206 closes, track-and-hold circuit block 103 samples the maximum voltage produced by the sawtooth oscillator 101, present at coupling 110. The operation of switch 209 is controlled by control logic circuit 107 (via control signal 117). To sample the voltage at coupling 110, switch 209 closes, charging capacitor 210 to the voltage at coupling 110. Switch 209 opens before switch 206 is closed and the voltage at coupling 110 falls back to its lowest voltage. Inputs to operational amplifiers generally draw substantially no current. With switch 209 open, substantially no current flows through switch 209 or into non-inverting input 220 of operational amplifier 210. Thus, the charge held in capacitor 210 remains there, keeping capacitor 210 charged to the peak voltage of the output of sawtooth oscillator 101. Operational amplifier 211 is wired as a unity gain follower with inverting input 221 coupled to output 227. As a unity gain follower, the voltage present in output 227 remains equal to the voltage present at non-inverting input 220 within the operating range of the operational amplifier. Thus, operational amplifier 211 maintains a voltage at coupling 111 equal to the voltage present across capacitor 210.

The voltage present at coupling 111 provides an input to voltage divider block 104. The upper end of voltage divider block 104 is coupling 111. The lower end of voltage divider block 104 is ground, coupled to the second terminal of resistor 215. Voltage divider block 104 uses resistors 212, 213, 214 and 215 to produce output voltages that are proportional to the voltage at coupling 111, according to the ratios of resistors 212, 213, 214 and 215. The ratio of the values of resistors 212, 213, 214 and 215 determine the voltages present at couplings 112 and 113. The exact absolute values of these resistors may vary within the operating range of the circuit. The ratios of the resistors are chosen to provide the precise delay desired for a particular motor system or to compensate for fixed delays inherent in the commutation process. As an example, resistors 212, 213, 214 and 215 may all have the same value. If these resistors all have the same value, the voltage divider provides a voltage at coupling 112 that is three-quarters of that present at coupling 111. The voltage divider provides a voltage at coupling 113 that is one-half of that present at coupling 111.

Since the voltage at coupling 111 is provided by track-and-hold circuit block 103 and represents the peak voltage of the output of sawtooth oscillator 101 over the last integration period, the voltage present at coupling 112 is three-quarters of the peak integrated voltage of the last integration period and the voltage at coupling 113 is one-half of the peak integrated voltage over the last integration period.

The operation of block 103A is complementary to block 103 in that it tracks when block 103 is holding and vice versa. Block 103A stores the value of voltage Vt (coupling 110) on capacitor 210A when 103 begins to track the voltage Vt. Switches 209 and 209A are operated such that track-and-hold circuit 103 stores the peak voltage attained by Vt and track-and-hold circuit 103A stores a voltage equal to a known fraction of the peak voltage from the previous cycle. By the action of the control logic and comparator block 105, switch 209A is opened when comparator block 105 goes high. Thus, the voltage stored on capacitor 210A is representative of a known fraction of the previous period typically the time represented by a change of state at coupling 114, OUT1. Voltage divider block 104A develops a fraction of voltage Vt and comparator 106A switches states when this fraction of Vt exceeds the output of block 103A. For example, if the voltage dividers are selected such that the voltage at coupling 112 is three-quarters that of the voltage at coupling 111, and the voltage at coupling 120 is one-half that of coupling 110, comparator block 106A changes state when Vt goes higher than one and one-half times the peak value from the previous cycle for resistor 230 and resistor 231 equal valued. The change of state of comparator block 106A will thus occur whenever a time equal to 1.5 times the previous period has elapsed and no back EMF event has occurred.

Upper comparator block 105 compares the voltage present at non-inverting input 222, which is coupled to coupling 110, to the voltage present at inverting input 223, which is coupled to coupling 112. At the beginning of the integration period, coupling 110 is at its lowest voltage. Coupling 112 is held for the duration of the integration period at approximately three-quarters of the peak integrated voltage over the previous integration period. As the present integration period proceeds, the output of the sawtooth oscillator, which is present at coupling 110, increases. When the voltage at coupling 110 exceeds the voltage at coupling 112, comparator 216 changes state and output 228 becomes active, thus changing the state of coupling 114.

Comparator block 106 includes comparator 217, which compares the voltages present at non-inverting input 224 and inverting input 225. Non-inverting input 224 is coupled to coupling 110. Inverting input 225 is coupled to coupling 113. The voltage present at coupling 110 represents the output of sawtooth oscillator block 101 and increases in proportion to the amount of time elapsed since detection of the last back-EMF signal. The voltage present at coupling 113 is approximately equal to half of the voltage present at coupling 111. The voltage present at coupling 111 represents the output of track-and-hold circuit 103 and is the maximum integrated voltage of the last commutation cycle. When an amount of time has elapsed in the present commutation cycle which is equal to approximately one-half of the duration of the previous commutation cycle, the voltage at non-inverting input 224, which is coupled to coupling 110, exceeds the voltage present at inverting input 225, which is coupled to coupling 113. When the voltage at non-inverting input 224 exceeds the voltage at inverting input 225, comparator 217 will change state and output 229 becomes active, thus changing the state of coupling 115 and causing it to become active.

The preferred embodiment can be used in conjunction with a motor speed control system which controls the desired rotational speed of the motor by counting clock pulses. If the speed control system controls the motor such that each rotation of the motor is a fixed number of clock pulse counts, each commutation period will closely approximate a fixed number of clock pulse counts. By relating $f_c$ (the integrator clock) to the speed control clock, the integrator and speed control will operate optimally for a wide range of motor speeds (set by selecting the clock pulse rate) without having to change component values.

Figure 3:
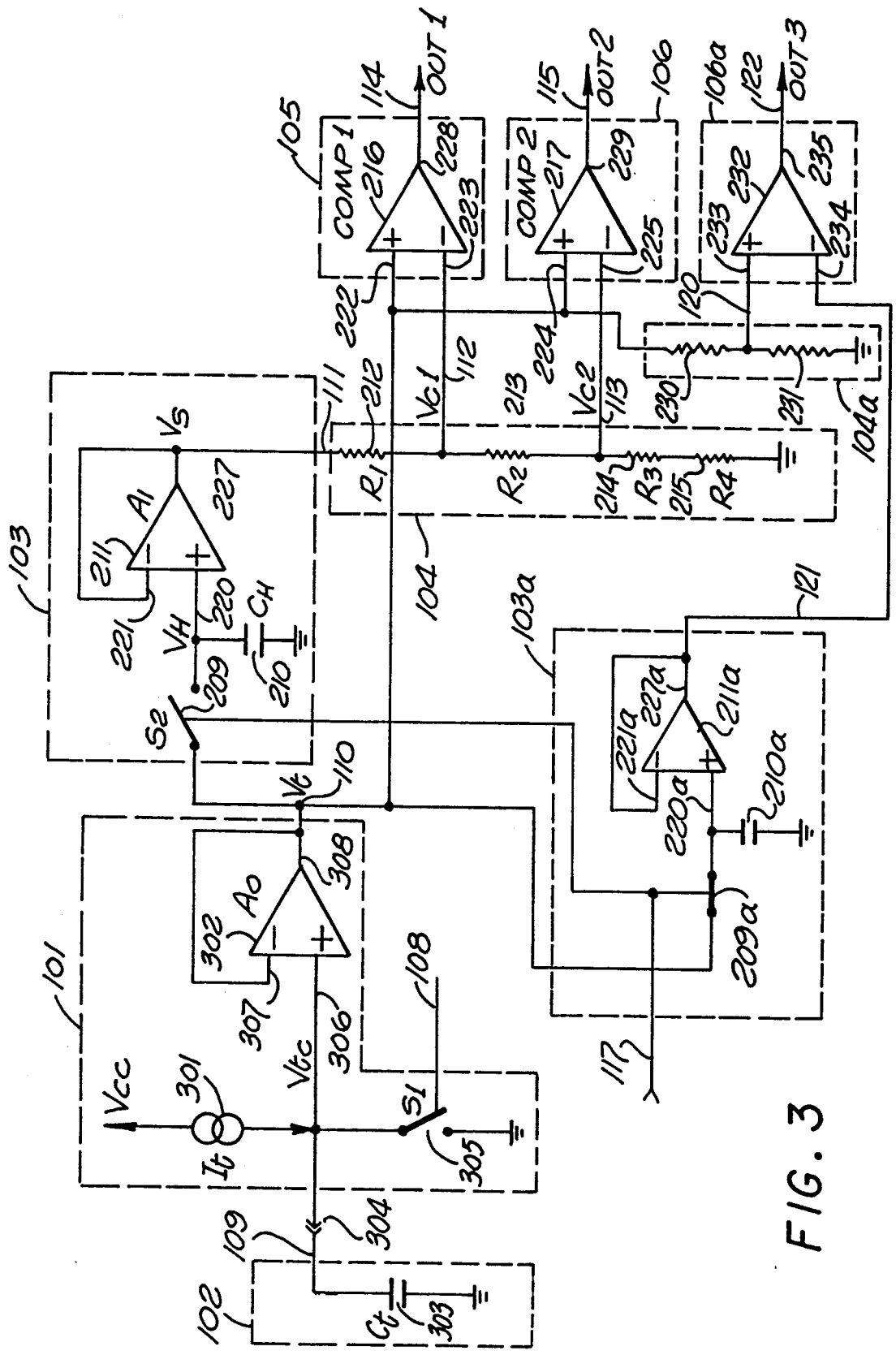
FIG. 3 is a schematic diagram illustrating an alternate embodiment of the present invention.

An alternate embodiment of the present invention is illustrated in FIG. 3. In the embodiment of the present invention of FIG. 3, sawtooth oscillator block 101 includes current source 301 and operational amplifier 302. The first terminal of current source 301 is coupled to supply voltage $V_{cc}$. The second terminal of current source 301 is coupled to bonding pad 304, to the first terminal of switch 305, and to non-inverting input 306 of operational amplifier 302. The second terminal of switch 305 is coupled to ground. Inverting input 307 of operational amplifier 302 is coupled to output 308 of operational amplifier 302. Output 308 of operational amplifier 302 is coupled to coupling 110. Switch 305 is coupled to control signal 108.

Coupling 110 is coupled to track-and-hold blocks 103 and 103A, respectively. Control of track-and-hold blocks 103 and 103A is provided by control signal 117. The output of track-and-hold block 103 is coupled to voltage divider 104 through coupling 111. The output of track-and-hold block 103A is coupled to inverting input 234 of comparator 232 in comparator block 106A through coupling 121. Coupling 110 is also coupled to voltage divider 104A. The output of voltage divider 104A is coupled to non-inverting input 233 of comparator 232 in comparator block 106A through coupling 120. Comparator blocks 105 and 106 are coupled to voltage divider 104, as described in connection with FIG. 2.

The embodiment of the present invention of FIG. 3 includes optional external control circuit block 102. External control circuit block 102 includes capacitor 303. The first terminal of capacitor 303 is coupled to coupling 109. Coupling 109 is coupled to bonding pad 304. The second terminal of capacitor 303 is coupled to ground.

Track-and-hold circuit block 103 of the embodiment of FIG. 3 includes switch 209, capacitor 210 and operational amplifier 211. The first terminal of switch 209 is coupled to coupling 110. The second terminal of switch 209 is coupled to the first terminal of capacitor 210 and non-inverting input 220 of operational amplifier 211. The second terminal of capacitor 210 is coupled to ground. Inverting input 221 of operational amplifier 211 is coupled to output 227 of operational amplifier 211 and to coupling 111. Switch 209 is coupled to control signal 117.

Voltage divider block 104 includes resistors 212, 213, 214 and 215. The first terminal of resistor 212 is coupled to coupling 111. The second terminal of resistor 212 is coupled to coupling 112 and to the first terminal of resistor 213. The second terminal of resistor 213 is coupled to coupling 113 and to the first terminal of resistor 214. The second terminal of resistor 214 is coupled to the first terminal of resistor 215. The second terminal of resistor 215 is coupled to ground.

Comparator block 105 includes comparator 216. Non-inverting input 222 of comparator 216 is coupled to coupling 110. Inverting input 223 of comparator 216 is coupled to coupling 112. Output 228 of comparator 216 is coupled to coupling 114.

Comparator block 106 includes comparator 217. Non-inverting input 224 of comparator 217 is coupled to coupling 110. Inverting input of comparator 217 is coupled to coupling 113. Output 229 of comparator 217 is coupled to coupling 115.

Control logic circuit 107 controls the operation of switch 305 (via control signal 108). As in FIG. 2, Back-EMF comparators 119 receive input from the motor coils and the commutation state counter, and provide signal 118 to control logic circuit 107 based on the back electromotive force (back-EMF) present in an unenergized motor winding terminal. Control logic circuit 107 provides control signal 108 to switch 305, and control signal 117 to switches 209 and 209A, based on the sensed back-EMF and the current commutation state.

Sawtooth oscillator block 101 of the embodiment of FIG. 3 integrates current over time to produce a linearly increasing voltage by charging capacitor 303 from supply voltage $V_{cc}$ at a rate controlled by current source 301. Operational amplifier 302 is configured as a unity gain follower, with inverting input 307 coupled to output 308. A unity gain follower produces an output that is equal to the voltage present at the non-inverting input over the operational amplifier's operating range. Switch 305, controlled by control logic circuit 107, determines the start of the integration cycles. To begin an integration cycle, switch 305 is momentarily closed, discharging capacitor 303. When capacitor 303 is discharged, the voltages at input 306 and output 308 of operational amplifier 302 go to zero. When switch 305 is opened, capacitor 303 begins to charge from current source 301, and the voltages at input 306 and output 308 of operational amplifier 302 begin to increase linearly with time. In those embodiments where capacitor 303 is much greater in value than capacitor 210, amplifier 302 may be deleted and coupling 306 may be connected to coupling 308.

When the output of sawtooth oscillator block 101 approaches the peak value of the previous back-EMF cycle, switch 209 closes to charge capacitor 210 to a voltage equal to the output of sawtooth oscillator block 101. In the preferred embodiment, switch 209 is closed when 114 (OUT 1) becomes active, and is opened just prior to the closure of switch 305. Operation of switch 209 is controlled by control logic circuit 107. Operational amplifier 211 is configured as a unity gain follower, with its inverting input 221 coupled to its output 227. Thus, the voltage at output 227 follows the voltage at non-inverting input 220, and coupling 111 is held at the voltage to which capacitor 210 is charged.

In block 103A, operational amplifier 211A is configured as a voltage follower with inverting input 221A coupled to output 227A and non-inverting input 220A coupled to capacitor 210A. The other terminal of capacitor 210A is coupled to ground. Switch 209A is configured to operate in opposite fashion from switch 209 such that for control 117 high, switch 209A is closed and the voltage on capacitor 210A follows the voltage on node 110.

When OUT1 is active, switch 209A opens and capacitor 210A holds the voltage of node 110 which is the measure of the time elapsed from the start of the cycle to the change of state of OUT1, approximately three-quarter of the previous cycle period.

Voltage divider block 104 proportionally reduces the voltage at coupling 111 to provide outputs at couplings 112 and 113. The voltages at coupling 112 and 113 are proportional to the duration of the previous back-EMF period. Since the voltage at coupling 110 represents the amount of time which has elapsed in the current back-EMF period, comparator blocks 105, 106 and 106A change output states when an amount of time greater than that represented by the voltages at couplings 112 and 113 (or twice that of 112) has elapsed in the present back-EMF period.

Although the embodiment of the present invention illustrated in FIG. 3 may be implemented using bonding pad 304 with capacitor 303 external to a single integrated circuit containing most of the circuitry, bonding pad 304 may be omitted and capacitor 303 may be incorporated into the integrated circuit for certain values of capacitor 303 when motor parameters are fixed. Provision for capacitor 303 to be external to the integrated circuit allows a greater range of motor parameters, while inclusion of capacitor 303 onto the integrated circuit reduces the cost, parts count and physical size of the circuitry.

Figure 4:
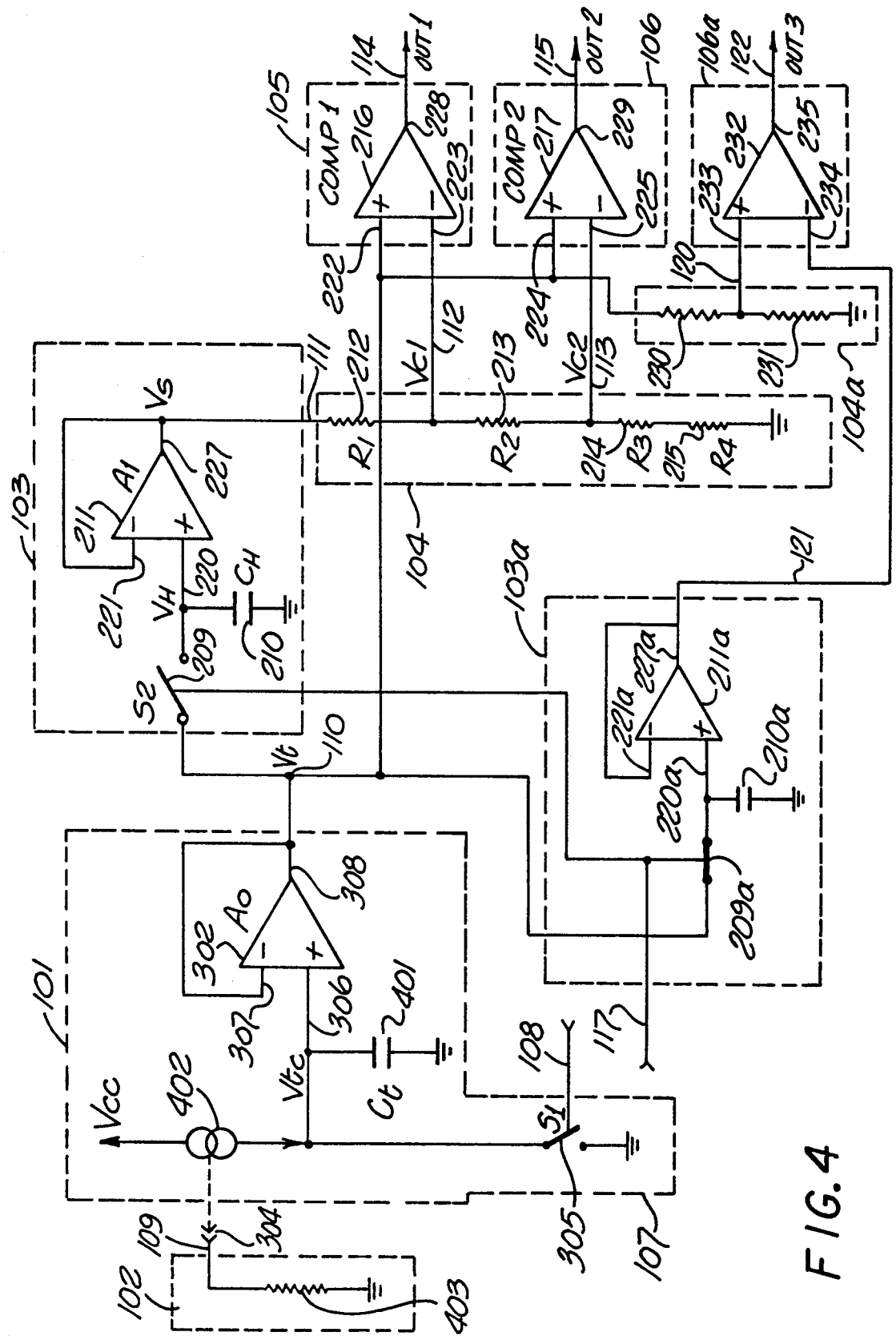
FIG. 4 is a schematic diagram illustrating another alternate embodiment of the present invention.

Another embodiment of the present invention is illustrated in FIG. 4. Sawtooth oscillator block 101 of this embodiment includes current source 402, capacitor 401 and operational amplifier 302. The first terminal of current source 402 is coupled to supply voltage $V_{cc}$. The second terminal of current source 402 is coupled to the first terminal of switch 305, the first terminal of capacitor 401 and non-inverting input 306 of operational amplifier 302. The second terminals of switch 305 and capacitor 401 are coupled to ground. Inverting input 307 of operational amplifier 302 is coupled to output 308 of operational amplifier 302 and to coupling 110. A third terminal of current source 402 is coupled to bonding pad 304. External control circuit block 102 of this embodiment includes resistor 403. The first terminal of resistor 403 is coupled to coupling 109, which is coupled to bonding pad 304. The second terminal of resistor 403 is coupled to ground. Switch 305 is coupled to control signal 108.

The remaining parts of the circuit, including track-and-hold circuit blocks 103 and 103A, voltage divider blocks 104 and 104A, comparator blocks 105, 106 and 106A, and control logic circuit 107 may be identical to the circuits employed in the alternate embodiment illustrated in FIG. 3.

Capacitor 401 of the embodiment of FIG. 4 is charged through current source 402 in a manner similar to that of the alternate embodiment in which capacitor 303 is charged through current source 301. As a substantially constant current passes through current source 402, capacitor 401 is charged to a voltage which increases substantially linearly over time. Operational amplifier 302 is configured as a unity gain follower, which produces an output voltage equal to the voltage present at its non-inverting input 306. Thus, the voltage at coupling 110 is equal to the linearly increasing voltage across capacitor 401. As in the embodiment of FIG. 3, switch 305 is opened or closed based on the beginning of the back-EMF cycle.

While the embodiment of the present invention illustrated in FIG. 3 allows the rate at which the output of sawtooth oscillator block 101 increases over time to be controlled by varying the value of capacitor 303, the embodiment of the present invention illustrated in FIG. 4 allows the rate to be controlled by varying the value of resistor 403. The rate at which current passes through current source 402 is controlled by the value of resistor 403. Thus, changing the value of resistor 403 changes the rate at which current passes through current source 402 and the rate at which capacitor 401 charges.

Figure 5:
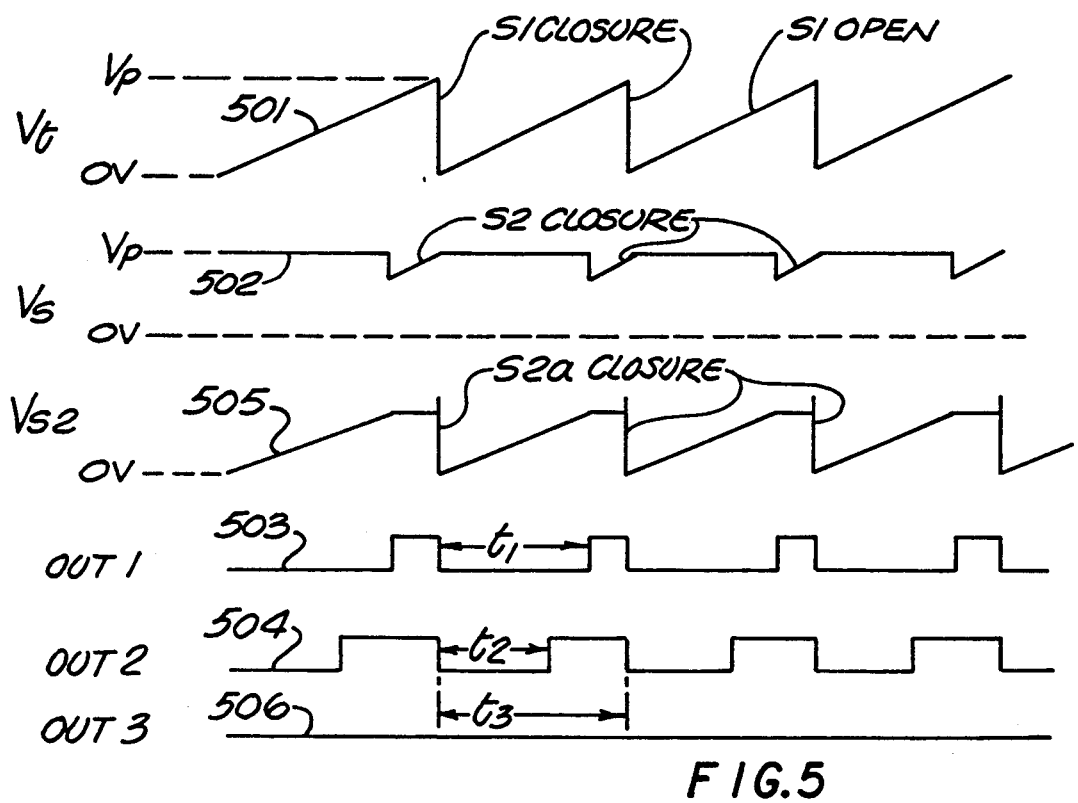
FIG. 5 is a timing diagram illustrating the timing relationships of the embodiments illustrated in FIGS. 2, 3 and 4 when the motor is operating at an invariant rotational speed.

FIG. 5 illustrates the waveforms generated while the motor is operating at an approximately constant speed. The first waveform 501 represents the voltage across capacitors 205, 303 and 401 (or the outputs of the unity gain voltage followers 226, 308, and 308) of the preferred embodiment of FIG. 2, the embodiment of FIG. 3, and the embodiment of FIG. 4 of the present invention, respectively. Voltage 501 increases substantially linearly until switch 206 (of FIG. 2) or 305 (or FIGS. 3 and 4) is closed, at which time the voltage rapidly falls to zero.

The second waveform 502 represents the voltage across capacitor 210 in any of the three given embodiments. Voltage 502 remains at the peak value of voltage 501 over the previous back-EMF cycle until after a portion of the duration of the previous back-EMF cycle has elapsed. After a portion of this duration has elapsed, switch 209 closes and the voltage across capacitor 210 tracks the output of sawtooth oscillator block 101. Immediately prior to the closure of switch 206 or 305, switch 209 is opened, thus holding voltage 502 at the peak voltage of the output of sawtooth oscillator block 101.

The third waveform 505 represents the voltage on capacitor 210A and thus the output of block 103A, the voltage on coupling 121. This is the value of the Vt during time $T_1$. The fourth waveform 503 represents the output of upper comparator block 105, which is present at coupling 114. The output of comparator block 105 remains at a low logic level while the voltage at coupling 110 is less than the voltage at coupling 112. When the voltage at coupling 110 exceeds the voltage at coupling 112, the output of comparator block 105 changes to a high logic level. If resistors 212, 213, 214 and 215 are all of the same value, voltage 503 will switch to a high logic level after approximately three-quarters of the back-EMF cycle has elapsed and switches from a high logic level to a low logic level at the beginning of each back-EMF cycle.

In addition to providing commutation delay, the circuit provides a method to counter-act deleterious effects of switching noise transients from the motor coils. In FIG. 5, the point of time where "S1 closure" occurs is when a back-EMF event occurs. (S1 refers to switches 206, 305, 706 and 813 on their respective figures.) After the delay, $t_2$, the motor coils are commutated, and since they are inductive in nature, they generate transient noise signals. These signals could be interpreted falsely by comparator and logic block 107 as valid back-EMF events and cause spurious motor operation. It is therefore necessary to block out, or ignore, back-EMF signals for some time after $t_2$. In fact, for the time span starting after a valid back-EMF event (S1 closure) until after the commutation delay ($t_2$ plus the noise blocking interval), all signals from back-EMF comparators 119 can beneficially be ignored. Voltage 503, for period $t_1$, accomplishes this function.

The fifth waveform 504 of FIG. 5 represents the output of lower comparator block 106. Voltage 504 remains at a low logic level while the voltage at coupling 110 is less than the voltage at coupling 113. When the voltage at coupling 110 exceeds the voltage at coupling 113, lower comparator block 106 switches from a low logic level to a high logic level. With resistors 212, 213, 214 and 215 equal in value, voltage 504 will switch from a low logic level to a high logic level after approximately half of the back-EMF cycle has elapsed and will switch from a high logic level to a logic level at the beginning of each back-EMF cycle.

The sixth waveform 506 represents the output of comparator block 106A. For this example of similar cyclic periods, OUT3, present at coupling 122, does not change state because Vt does not attain a voltage greater than the reciprocal of voltage divider fraction of block 104A times the voltage stored on capacitor 210A.

Figure 6:
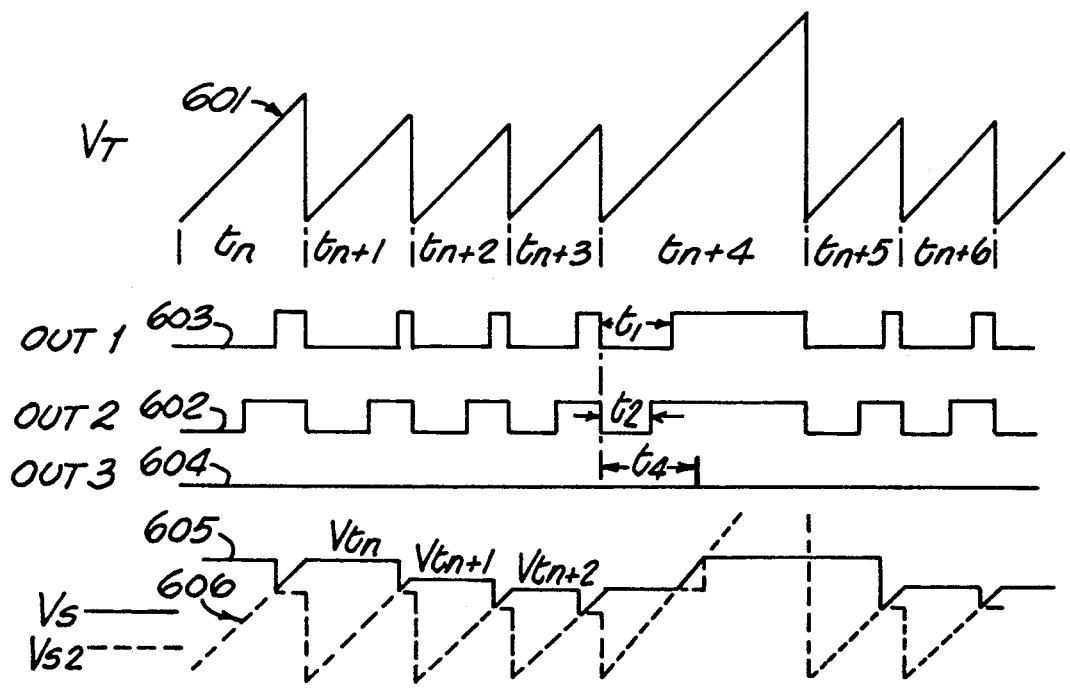
FIG. 6 is a timing diagram illustrating the timing relationships of the embodiments illustrated in FIGS. 2, 3 and 4 when the motor is accelerating and operation with a spurious speed variation.

FIG. 6 illustrates waveforms representing the operation of the given embodiments of the present invention during motor acceleration and also the case of an extraordinary time between back-EMF events. The first waveform 601 of FIG. 6 represents the voltage across capacitors 203, 303 and 401 of the embodiment of FIG. 2, the embodiment of FIG. 3, and the embodiment of FIG. 4, respectively, during motor acceleration. As the motor speed increases, the amount of time required for the motor rotor to move a fixed amount of angular rotation decreases. As a result, the duration of a back-EMF cycle is reduced. The times $t_n$, $t_{n+1}$, $t_{n+2}$ and $t_{n+3}$ are decreasing. Since the peak voltage of capacitors 203, 303 and 401 is proportional to the duration of the back-EMF cycle, the peak value of voltage 601 decreases as the motor accelerates. As seen in FIG. 6, the period and amplitude of the first waveform decrease as the motor accelerates.

The second waveform 603 of FIG. 6 represents the output of upper comparator block 105 during motor acceleration. Since comparator block 105 is coupled to the voltage divider output which produces a voltage approximately three-quarters of the input voltage when the voltage divider resistors are equal, the low-to-high transition of voltage 603 occurs after approximately three-quarters of the duration of the previous back-EMF cycle, and the high-to-low transition occurs at the beginning of the next back-EMF cycle. Voltage 503 or 603 can be used to directly or indirectly control the closure of S2. (S2 refers to switches 209, 709, 1501, 1205A and 1205B on their respective figures.)

The third waveform 602 of FIG. 6 illustrates the output of comparator block 106 as the motor accelerates. With resistors 212, 213, 214 and 215 of equal value, voltage 602 changes from a low logic level to a high logic level after approximately half of the duration of the previous back-EMF cycle has elapsed and changes from a high logic level to a low logic level at the beginning of each back-EMF cycle. Since the duration of each back-EMF cycle becomes progressively shorter as the motor accelerates, the low-to-high transition of voltage 602 occurs progressively earlier. However, since the duration of the cycle continues to decrease, the low-to-high transition of voltage 602 occurs at approximately the same relative position in the cycle.

The fifth waveform 605 of FIG. 6 represents the voltage on capacitor 210. The stored voltage is indicative of the previous period duration. The sixth waveform 606 of FIG. 6 represents the voltage on capacitor 210A. The stored voltage is equal to the voltage on Vt during the time $t_1$ for each cycle. Because $t_1$ is a fraction of the previous period determined by voltage divider 104, the voltage stored on capacitor 210A is a fractional representation of the duration of the previous period.

The fifth cycle, period $t_{n+4}$ shown in FIG. 6, illustrates the action of comparator block 106A. This cycle represents a period much greater than the previous cycle and, for motor applications, should be considered erroneous or spurious operation. Since motor speed cannot typically change so rapidly between adjacent cycles, a waveform such as 601 (Vt) at time $t_{n+4}$ indicates improper operation of the back-EMF comparators or temporary interruption of the motor sequencing. If this (unusually long and most likely improper) period was stored by the circuit, the subsequent period $t_{n+5}$ would most likely fall within the noise blanking interval ($t_1$ for the cycle $t_{n+5}$ would be a large value having been determined by the previous long period $t_{n+4}$) and be ignored. However, block 103A has stored the voltage Vt at time $t_1$ of period $t_{n+3}$, and when the fraction of Vt set by voltage divider 104A exceeds the voltage stored on capacitor 210A, comparator block 106A will change state. When comparator block 106A changes, it changes block 103 from tracking to holding and block 103A from holding to blocking. Thus, the voltage represented by 605 is prevented from tracking Vt to its (erroneous) peak value and is instead limited to a voltage that is greater than the previous peak value by a known value.

By the action of the noise blanking (period $t_1$) and the action of blocks 103A, 104A and 106A (period $t_4$), response to back-EMF signals is bounded in time, based on the period of the previous cycle.

Although FIGS. 5 and 6 show the outputs of comparator blocks 105 and 106 changing at three-quarters and one-half of the duration of the previous back-EMF cycle, representively, other proportions may be selected by altering the ratios of resistors 212, 213, 214 and 215. The values of resistors 212, 213, 214 and 215 do not have to be equal (although they may be) and may be set to any appropriate values to provide the desired timing relationships. Likewise, the values of resistors 230 and 231 may be set to any appropriate values to provide the desired relationships.

Figure 7:
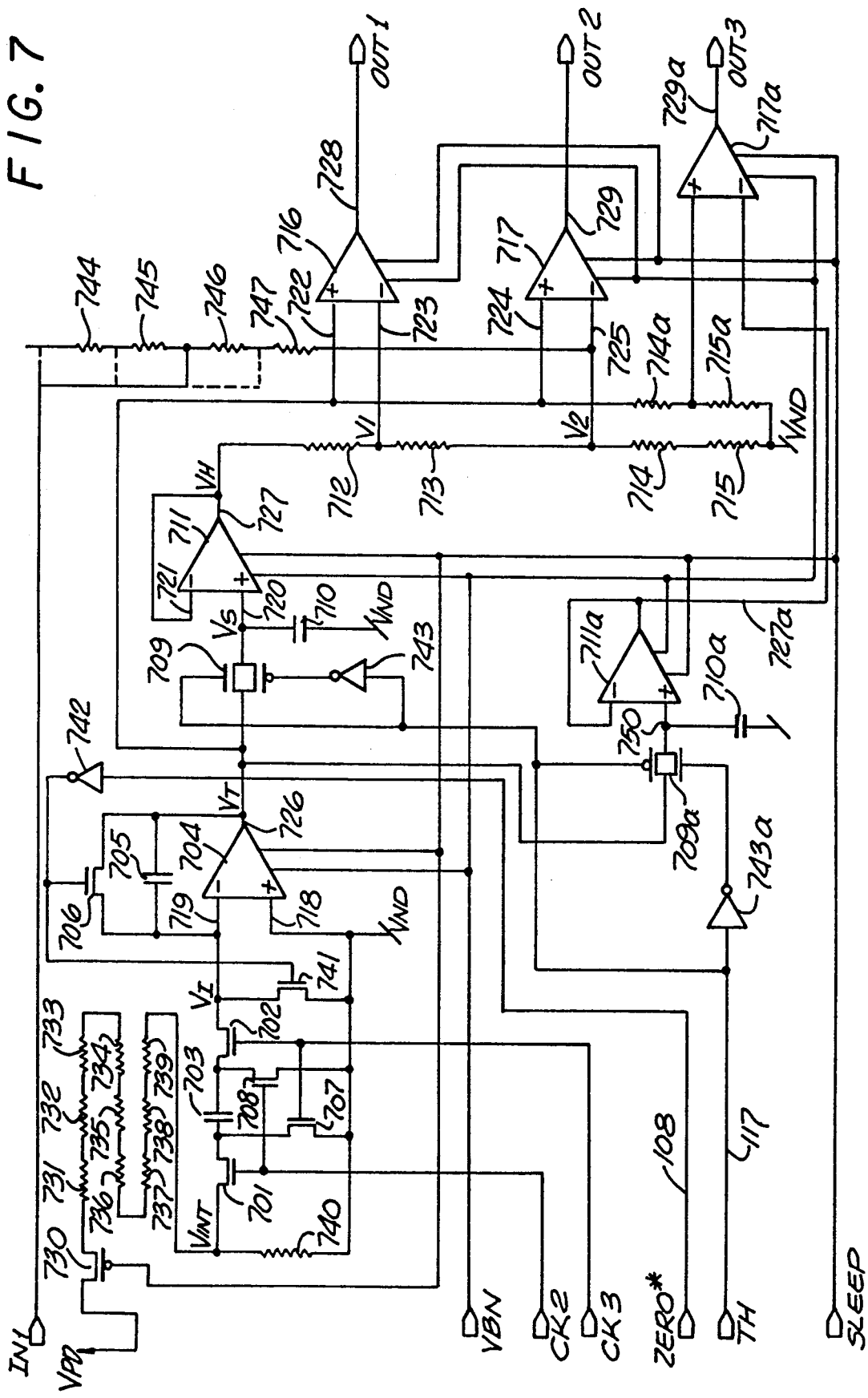
FIG. 7 is a detailed schematic diagram illustrating the preferred embodiment of the present invention.

A CMOS implementation of the preferred embodiment of the present invention of FIG. 2 is illustrated in FIG. 7. In the CMOS implementation, the positive supply voltage VPD is coupled to the first terminal of p-channel MOSFET 730. The second terminal of p-channel MOSFET 730 is coupled to the first terminal of resistor 731. The second terminal of resistor 731 is coupled to the first terminal of resistor 732. The second terminal of resistor 732 is coupled to the first terminal of resistor 733. The second terminal of resistor 733 is coupled to the first terminal of resistor 734. The second terminal of resistor 734 is coupled to the first terminal of resistor 735. The second terminal of resistor 735 is coupled to the first terminal of resistor 736. The second terminal of resistor 736 is coupled to the first terminal of resistor 737. The second terminal of resistor 737 is coupled to the first terminal of resistor 738. The second terminal of resistor 738 is coupled to the first terminal of resistor 739. The second terminal of resistor 739 is coupled to node VINT. Node VINT is also coupled to the first terminal of n-channel MOSFET 701 and to the first terminal of resistor 740. The second terminal of resistor 740 is coupled to negative supply voltage VND.

The second terminal of n-channel MOSFET 701 is coupled to the first terminal of capacitor 703 and to the first terminal of n-channel MOSFET 707. The second terminal of n-channel MOSFET 707 is coupled to negative supply voltage VND. The second terminal of capacitor 703 is coupled to the first terminal of n-channel MOSFET 702 and to the first terminal of n-channel MOSFET 708. The second terminal of n-channel MOSFET 708 is coupled to the negative supply voltage VND. The gate terminals of n-channel MOSFET's 701 and 708 are coupled to input CK2. The gate terminals of n-channel MOSFET's 702 and 707 are coupled to input CK3. The second terminal of n-channel MOSFET 702 is coupled to node VI.

Node VI is also coupled to the first terminal of n-channel MOSFET 741, to inverting input 719 of operational amplifier 704, to the first terminal of capacitor 705 and to the first terminal of n-channel MOSFET 706. The second terminal of n-channel MOSFET 741 is coupled to negative supply voltage VND. Input ZERO*, which is equivalent to control signal 108, is coupled to the input of inverter 742. The output of inverter 742 is coupled to the gate terminals of n-channel MOSFET's 706 and 741. Non-inverting input 718 of operational amplifier 704 is coupled to negative supply voltage VND. The second terminal of n-channel MOSFET 706 is coupled to node VT. Node VT is also coupled to the second terminal of capacitor 705, to output 726 of operational amplifier 704, to the first terminals of CMOS switches 709 and 709A, to non-inverting input 722 of comparator of 716, to non-inverting input 724 of comparator 717, and through resistor 714A to the non-inverting input of comparator 717A. The non-inverting input of comparator 717A is coupled through resistor 715A to VND.

The second terminal of CMOS switch 709 is coupled to node VS. Node VS is also coupled to the first terminal of capacitor 710 and to non-inverting input 720 of operational amplifier 711. The second terminal of capacitor 710 is coupled to negative supply voltage VND. Output 727 of operational amplifier 711 is coupled to node VH. Node VH is also coupled to inverting input 721 of operational amplifier 711 and to the first terminal of resistor 712. The second terminal of resistor 712 is coupled to node V1. Node V1 is also coupled to inverting input 723 of comparator 716 and to the first terminal of resistor 713. The second terminal of resistor 713 is coupled to node V2.

The second terminal of CMOS switch 709A is coupled to node 750. Note 750 is coupled through capacitor 710A to ground and to the non-inverting input of comparator 711A. Switches 709 and 709A are controlled by signal 117. Signal 117 is coupled through inverter 743A to one control terminal of switch 709A and is coupled directly to the other control terminal of switch 709A. Signal 117 is also coupled through inverter 743 to one control terminal of switch 709 and is coupled directly to the other control terminal of switch 709. The output 727A of amplifier 711A is coupled to amplifier 711A and to the inverting input of comparator 717A.

Resistors 744, 745, 746 and 747 provide optional alternative connections to terminal IN1. The first terminal of resistor 744 is left unconnected. The second terminal of resistor 744 is coupled to the first terminal of resistor 745. The second terminal of resistor 745 is coupled to the first terminal of resistor 746. The second terminal of resistor 746 is coupled to the first terminal of resistor 747. The second terminal of resistor 747 is coupled to node V2. Input IN1 may be connected to the first terminal of any one of the resistors 744, 745, 746 and 747, as shown in FIG. 7. Node V2 is also coupled to inverting input 725 of comparator 717 and to the first terminal of resistor 714. The second terminal of resistor 714 is coupled to the first terminal of resistor 715. The second terminal of resistor 715 is coupled to negative supply voltage VND. Output 728 of comparator 716 is coupled to output OUT1. Output 729 of comparator 717 is coupled to output OUT2. Output 729A of comparator 717A is coupled to output OUT3.

Input TH, which is equivalent to control signal 117, is coupled to the n-channel input of CMOS switch 709 and to the input of inverter 743. The output of inverter 743 is coupled to the p-channel input of CMOS switch 709. Signal 117 is coupled through inverter 743A to the n-channel input of switch 709A and is coupled directly to the p-channel input of switch 709A.

Input VBN is coupled to operational amplifiers 704, 711 and 711A, as well as comparators 716, 717 and 717A. Input SLEEP is coupled to the gate terminal of p-channel MOSFET 730, to operational amplifiers 704, 711 and 711A, and to comparators 716, 717 and 717A.

Since the circuit in FIG. 7 is a CMOS implementation of the preferred embodiment of the present invention, the operation of the circuit in FIG. 7 is very similar to that of the preferred embodiment illustrated in FIG. 2.

In the CMOS implementation of the preferred embodiment, resistors 731 through 740 form a voltage divider that produces a voltage at node VINT. Capacitor 703 and n-channel MOSFET's 701, 702, 707 and 708 form a switched capacitor circuit which acts as a current source. This current source passes an amount of current that is controlled by the frequency of the clock signals present at inputs CK2 and CK3 from node VINT to node VI. The clock signals present at inputs CK2 and CK3 are complementary, such that when the signal at input CK2 is high, the signal at input CK3 is low, and when the signal at input CK2 is low, the signal at input CK3 is high.

Operational amplifier 704, capacitor 705, n-channel MOSFET's 706 and 741, and inverter 742 form an integrator circuit. Current from the switched capacitor current source charges capacitor 705 of the integrator circuit, with operational amplifier 704 producing a voltage which increases linearly over time during the integration process. Inverter 742 and n-channel MOSFET's 706 and 741 are used to control the start of the integration cycle. When input ZERO* goes low, the output of inverter 742 goes high, causing n-channel MOSFET's 706 and 741 to conduct. When n-channel MOSFET 706 conducts, it discharges capacitor 705. When n-channel MOSFET 741 conducts, it pulls the voltage at inverting input 719 of operational amplifier 704 to negative supply voltage VND. When input ZERO* is asserted, the output of the integration circuit, which is present at node VT, goes to its lowest value.

As the integration process proceeds, the voltage at node VT increases linearly over time. When the integrated voltage at node VT approaches the peak integrated voltage of the previous back-EMF cycle, input TH is asserted to turn on CMOS switch 709. When CMOS switch 709 is on, the voltage at node VT is conducted to node VS and capacitor 710 is charged to the voltage at the output of the integration circuit. Upon the occurrence of the subsequent back-EMF event, input TH is de-asserted to hold the voltage at node VT on capacitor 710. When CMOS switch 709 is non-conducting, input ZERO* is asserted briefly to re-initialize the integrator of capacitor 705, etc. Since the inputs of operational amplifiers generally draw substantially no current, when CMOS switch 709 is turned off, there is no path for current to flow which would discharge capacitor 710. Thus, capacitor 710 is held at the peak voltage of the previous integration cycle. Operational amplifier 711 has its inverting input 721 coupled to its output 727. It forms a unity gain follower, which produces the same output voltage at output 727 as the voltage present at non-inverting input 720. Thus, the voltage at node VH is equal to the peak integrated voltage of the previous back-EMF cycle.

Resistors 712, 713, 714 and 715 form a voltage divider that provides two output voltages. These output voltages are present at nodes V1 and V2. Input IN1 and resistors 744, 745, 746 and 747 may be used to adjust the voltage present at node V2. To adjust the voltage at node V2, an external circuit sinks or sources current at input IN1. By adjusting current flow and direction into this terminal, the delay time can be altered from the value set by the resistor ratios. Precise adjustment of the voltage at node V2 is desirable since it allows precise adjustment of the commutation delay. By precisely adjusting the commutation delay, non-ideal back-EMF-to-rotor-position correspondence or fixed time delays inherent in the commutation process may be compensated to optimize motor performance. In this way, input IN1 can be used to externally apply fine adjustment of the adaptive delay to compensate for motor non-idealities and switching delays. Input VBN is used to set the bias point of operational amplifiers 704 and 711 and comparators 716 and 717. Input SLEEP is used to reduce the quiescent current of the circuit when not in use. MOSFET 730 interrupts current flow through resistors 731 to 740 to reduce power consumption of the circuit.

Figure 8:
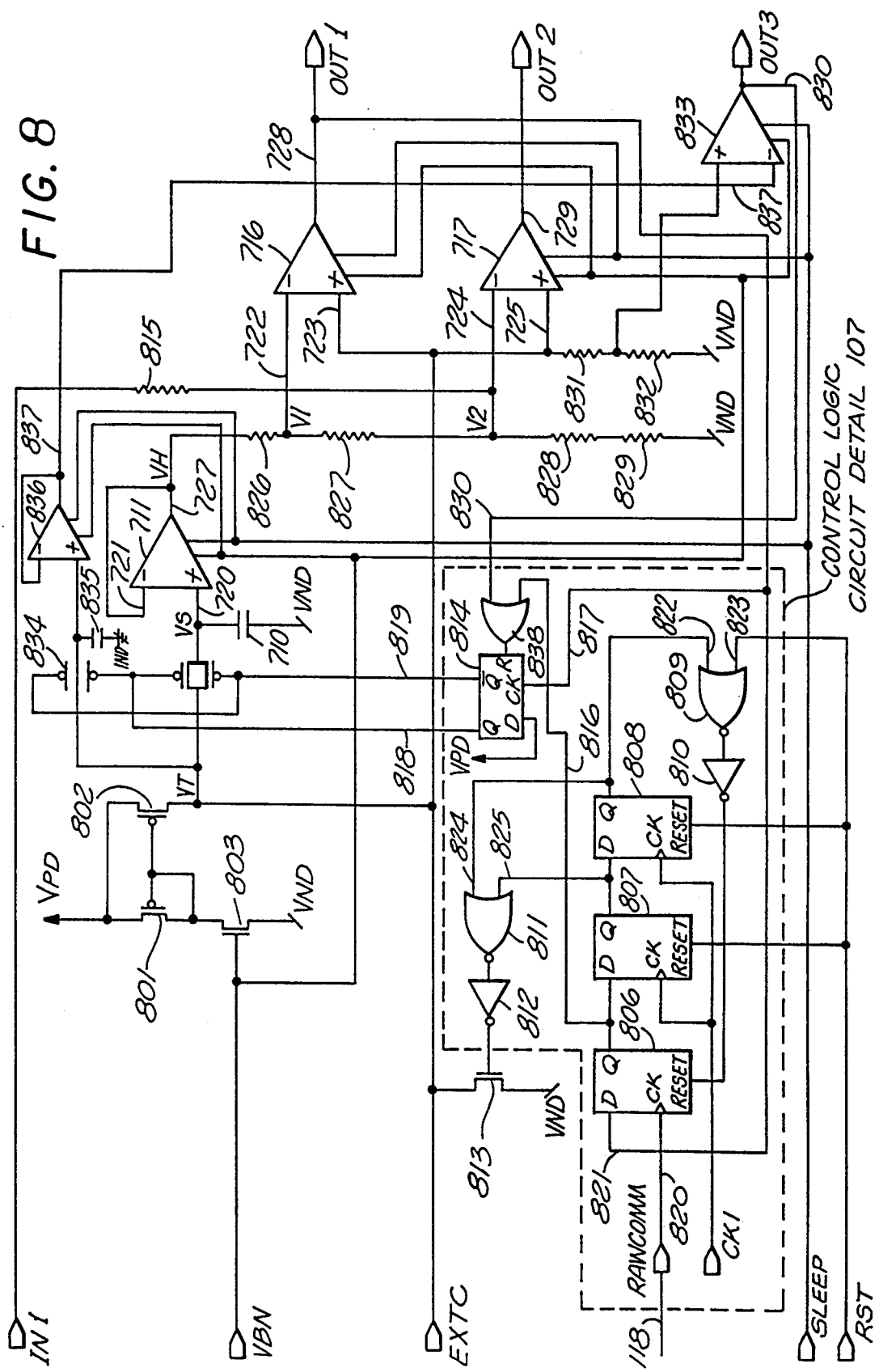
FIG. 8 is a detailed schematic diagram illustrating an alternate embodiment of the present invention of FIG. 3 and illustrates control logic appropriate for all embodiments.

A CMOS implementation of the alternate embodiment of the present invention of FIG. 3 is illustrated in FIG. 8. In the CMOS implementation, positive supply voltage VPD is coupled to the first terminals of p-channel MOSFET's 801 and 802. The second terminal of p-channel MOSFET 801 is coupled to the gates of p-channel MOSFET's 801 and 802 and to the first terminal of n-channel MOSFET 803. The second terminal of n-channel MOSFET 803 is coupled to negative supply voltage VND. The second terminal of p-channel MOSFET 802 is coupled to node VT. Node VT is also coupled to the first terminal of CMOS switches 709 and 834, input EXTC, the first terminal of n-channel MOSFET 813, non-inverting input 723 of comparator 716 and to non-inverting input 725 of comparator 717 and first terminal of resistor 831.

The second terminal of CMOS switch 709 is coupled to node VS. Node VS is also coupled to the first terminal of capacitor 710 and to non-inverting input 720 of operational amplifier 711. The second terminal of switch 834 is coupled to capacitor 835 and to the non-inverting input of comparator 836. The second terminals of capacitors 710 and 835 are coupled to negative supply voltage VND. Output 727 of operational amplifier 711 is coupled to node VH. Node VH is also coupled to inverting input 721 of operational amplifier 711 and to the first terminal of resistor 826. The second terminal of resistor 826 is coupled to node V1. Node V1 is also coupled to the first terminal of resistor 827 and to inverting input 722 of operational amplifier 716. Input IN1 is coupled to the first terminal of resistor 815. The second terminal of resistor 815 is coupled to node V2. Node V2 is also coupled to the second terminal of resistor 827, the first terminal of resistor 828 and inverting input 724 of operational amplifier 717. The second terminal of resistor 828 is coupled to the first terminal of resistor 829. The second terminal of resistor 829 is coupled to negative supply voltage VND.

Control logic circuit 107 is illustrated in greater detail by the dashed box in FIG. 8. Output 729 of comparator 717 is coupled to output OUT2. Output 728 of comparator 716 is coupled to output OUT1, to CK input 817 of D flip-flop 814 and to the D input of flip-flop 806. Input RAWCOMM (which receives control signal 118) is coupled the clock input of D flip-flop 806. Input CK1 is coupled to the clock inputs of D flip-flops 807 and 808. Input RST is coupled to the reset inputs of D flip-flops 807 and 808 and to input 823 of NOR gate 809. The Q output of D flip-flop 806 is coupled to the D input of D flip-flop 807 and to input OR gate 838. The output of OR gate 838 is coupled to the reset input of flip-flop 814. The Q output of D flip-flop 807 is coupled to the D input of D flip-flop 808 and to input 825 of NOR gate 811. Output Q of D flip-flop 808 is coupled to input 824 of NOR gate 811 and to input 822 of NOR gate 809. The output of NOR gate 809 is coupled to the input of inverter 810. The output of inverter 810 is coupled to the reset input of D flip-flop 806. The output of NOR gate 811 is coupled to the input of inverter 812. The output of inverter 812, which is equivalent to control signal 108, is coupled to the gate terminal of n-channel MOSFET 813. The second terminal of n-channel MOSFET 813 is coupled to negative supply voltage VND.

Output (and control signal) 818 of flip-flop 814 is coupled to the n-channel gate terminal of CMOS switch 709 and to the n-channel gate terminal of CMOS switch 834. Output 819 of flip-flop 814 is coupled to the p-channel gate terminal of CMOS switches 709 and 834.

The output 837 of amplifier 836 is coupled in a feedback loop to the inverting input of itself. The output 837 is also coupled to the inverting input of comparator 833. The output 830 of comparator 833 is the OUT3 signal and is also coupled to one input of OR gate 838.

Input SLEEP is coupled to operational amplifier 711, 836 and to comparators 716, 717 and 833. Input VBN is coupled to the gate terminal of n-channel MOSFET 803, to operational amplifier 711, 836 and to comparators 716, 717 and 833. Since the CMOS implementation illustrated in FIG. 8 is based on the alternate embodiment of the present invention illustrated in FIG. 3, the operation of the CMOS implementation of FIG. 8 is very similar to that of the alternate embodiment of FIG. 3. In the CMOS implementation of the alternate embodiment of the present invention, p-channel MOSFET's 801 and 802 and n-channel MOSFET 803 form a current mirror circuit that provides a current source. The current source provides current to charge an external capacitor connected to input EXTC. By varying the value of the external capacitor, it is possible to adjust the timing range of the circuit to accommodate motor systems with different characteristics.

Control signal 118, derived from back-EMF pulses, is applied to the circuit at input RAWCOMM, which is connected to CK of flip-flop 806. The D input of flip-flop 806 is coupled to OUT1. OUT1 is logic 0 until the desired noise blanking time has occurred, when it goes to logic 1. The first positive rising signal on RAWCOMM clocks the logic high signal of OUT1 to the Q output of flip-flop 806.

NOR gate 809, inverter 810, NOR gate 811, inverter 812, D flip-flop 814 and D flip-flops 806, 807 and 808 together form a sequencing circuit that ensures that events occur with the proper timing. A back-EMF signal results in the clocking of D flip-flop 806 and since the D input of D flip-flop 806 is coupled to OUT1, a high value is clocked through the flip-flop and appears at the Q output of D flip-flop 806. The high value is applied to reset input 816 of D flip-flop 814, causing control signal 818 to go low and output 819 to go high. Since control signal 818 is coupled to the n-channel gate terminal of CMOS switch 709 and P-channel gate of switch 834, and output 819 is coupled to the p-channel gate terminal of CMOS switch 709 and the N-channel gate of switch 834, CMOS switch 709 will be turned off and switch 834 will be turned on. The clock inputs of D flip-flops 807 and 808 are coupled to input CK1, which is pulsed at a regular rate. The clock signal present at input CK1 clocks the data present at the D input of D flip-flop 807 through D flip-flops 807 and 808. On the first clock pulse of input CK1 after output Q of D flip-flop 806 goes high, a high value will be clocked through D flip-flop 807, and the Q output of D flip-flop 807 will go high, driving input 825 of NOR gate 811 high. When input 825 of NOR gate 811 goes high, the output of NOR gate 811 goes low, and inverter 812 asserts control signal 108 at the gate terminal of n-channel MOSFET 813. This high signal turns on n-channel MOSFET 813, and the external capacitor, which is coupled to input EXTC, will be discharged through n-channel MOSFET 813 to negative supply voltage VND.

At the next clock pulse of input CK1, the high value at the Q output of D flip-flop 807 is clocked through D flip-flop 808 and appears at the Q output of D flip-flop 808. The high value at the Q output of D flip-flop 808 is applied to input 824 of NOR gate 811 and to input 822 of NOR gate 809. The high value at input 824 continues to hold the output of NOR gate 811 low, and inverter 812 continues to drive the gate terminal of n-channel MOSFET 813 high, completing the discharge of the external capacitor coupled to input EXTC. The high value at input 822 produces a low value at the output of NOR gate 809, which is inverted by inverter 810 to produce a high value at the reset input of D flip-flop 806. A high value at the reset input of D flip-flop 806 will cause the Q output of D flip-flop 806 to go low. Although the low value is then applied to input 816 of SR flip-flop 814, outputs 818 and 819 of D flip-flop 814 will remain unchanged.

At the next clock pulse of input CK1, the low value at the Q output of D flip-flop 806 is clocked through D flip-flop 807 and appears at the Q output of D flip-flop 807. Although this low value drives input 825 of NOR gate 811 low, the output of NOR gate 811 remains unchanged since input 824 remains high. After the next clock pulse at input CK1, the low value at the Q output of D flip-flop 807 is clocked through D flip-flop 808 and appears at the Q output of D flip-flop 808. This low value drives input 824 of NOR gate 811 low. With both inputs 824 and 825 of NOR gate 811 now low, the output of NOR gate 811 goes high and is inverted by inverter 812 to apply a low control signal 108 to the gate terminal of n-channel MOSFET 813. MOSFET 813 is turned off, disconnecting the external capacitor coupled to input EXTC from negative supply voltage VND and allowing the external capacitor to begin to charge from the current source based on MOSFET's 801, 802 and 803.

The low value at the Q output of D flip-flop 808 will also drive input 822 of NOR gate 809 low, producing a high output of NOR gate 809. This high output will be inverted by inverter 810 to apply a low value to the reset input of D flip-flop 806. Thus, D flip-flop 806 is ready to accept a new clock signal at the next valid back-EMF pulse. Input RST allows D flip-flops 806, 807 and 808 to be cleared simultaneously, which may be desirable at such times as initial power-up.

When n-channel MOSFET 813 is turned off, the external capacitor connected to input EXTC begins to charge. Since the current source provided by MOSFET's 801, 802 and 803 provides a constant current, the voltage of the external capacitor increases linearly over time. This voltage is applied to non-inverting input 723 of comparator 716 and to non-inverting input 725 of comparator 717. When CMOS switch 709 is on, the voltage from the external capacitor at input EXTC is applied to capacitor 710 at node VS. As described above, the sequencing circuit turns off CMOS switch 709 before discharging the external capacitor. With CMOS switch 709 off, the peak voltage across the external capacitor is preserved across capacitor 710. Operational amplifier 711 is configured as a unity gain follower to produce a voltage at node VH which is equal to the voltage at node VS. The voltage at node VH is proportionally reduced by the voltage divider which includes resistors 826, 827, 828 and 829. This voltage divider produces voltages at nodes V1 and V2. Node V1 provides a reference voltage for comparator 716.

Node V2 provides a reference voltage for comparator 717, although this reference voltage may be adjusted by sinking or sourcing current through input IN1. Adjustment of the reference voltage of comparator 717 is desirable to compensate for non-ideal back-EMF-to-rotor-position correspondence or fixed time delays inherent in the commutation process to optimize motor performance. When the integrated voltage across the external capacitor exceeds the reference voltage for comparator 716, output 728 of comparator 716 and output OUT1 change state, clock input 817 of D flip-flop 814 is asserted, and D input 821 of flip-flop 806 is enabled. With input 817 enabled, D flip-flop 814 is forced to change state, causing control signal 818 to go high and output 819 to go low. Since control signal 818 is coupled to the n-channel gate terminal of CMOS switch 709 and output 819 is coupled to the p-channel gate terminal of CMOS switch 709, CMOS switch 709 is then turned on, allowing capacitor 710 to charge to the voltage of the external capacitor at input EXTC. For cycles when OUT3 becomes active high, the RESET signal to flip-flop 814, signal 830, will force output 818 low and output 819 high. Thus, after a predetermined period, flip-flop 814 will be reset in a manner similar to the occurrence of a valid back-EMF signal. With input 821 of D flip-flop 806 enabled, back-EMF signals received from control signal 118 at input RAWCOMM are recognized as valid.

Input VBN is used to adjust the operation of the current source which includes MOSFET's 801, 802 and 803, as well as operational amplifier 711 and comparators 716 and 717. Input SLEEP is used to reduce the quiescent current of the circuit.

Although in the preferred embodiment of the present invention the voltage holding circuit receives its input from the sawtooth oscillator and provides its output to the voltage attenuator, which, in turn, provides its output to the comparators, the present invention may be practiced in other forms. For example, the output of the sawtooth oscillator may be coupled to the voltage proportioning circuit, the output of which may be coupled to the input of the voltage holding circuit with the output of the voltage holding circuit coupled to the comparators. Also, the voltage holding circuit of the preferred embodiment may be a sample-and-hold circuit, a track-and-hold circuit or any other type of voltage holding circuit.

Although the preferred embodiment of the present invention includes a sawtooth oscillator, the present invention is not limited to the use of sawtooth oscillators. The present invention may be practiced with other types of oscillators. Oscillators that produce outputs that do not change linearly over time may be used to compensate for motor system non-idealities which are a function of motor speed. Use of oscillators with nonlinear outputs may require changes in the proportional adjustment provided by the voltage holding and proportioning circuit.

Also, the present invention is not limited to the use of oscillators that produce an output that has a positive slope over time. Oscillators that produce waveforms with some portion of the waveform having a negative slope may also be used with the present invention. Use of an oscillator with an output of negative slope may require polarity reversal of the comparator inputs.

Although the preferred embodiment of the present invention has two comparators, the present invention may be practiced with any number of comparators. The present invention may also be practiced with any number of track-and-hold circuits, sample-and-hold circuits, voltage dividers, attenuators, amplifier circuits or voltage divider output taps.

Figure 11:
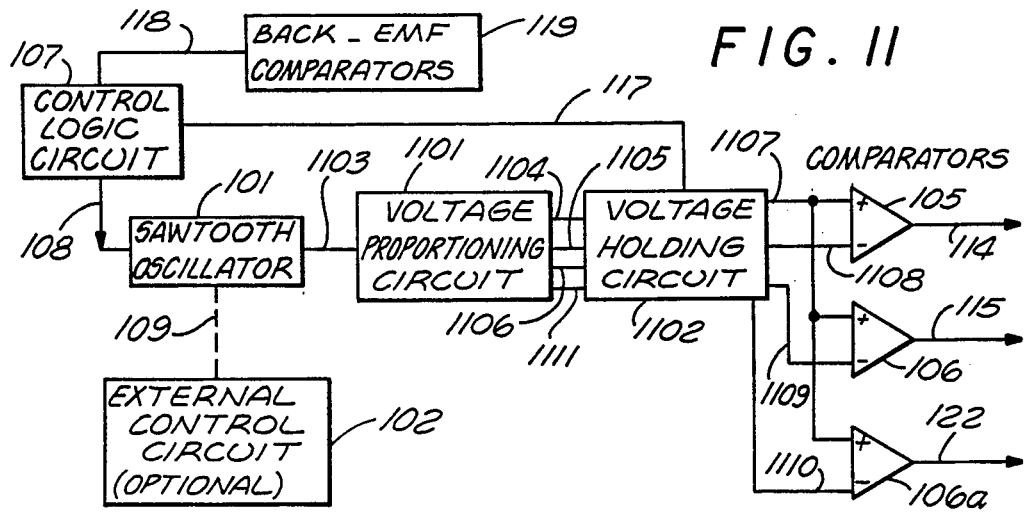
FIG. 11 is a block diagram illustrating yet another alternate embodiment of the present invention.

The block diagram of another alternate embodiment of the present invention is illustrated in FIG. 11. In FIG. 11, back-EMF comparators 119 provide signal 118 to control logic circuit 107. Control logic circuit 107 controls the operation of a sawtooth oscillator 101 (via control signal 108) and voltage holding circuit 1102 (via control signal 117). External control circuit 102 is optional and, if present, is coupled to sawtooth oscillator 101 by coupling 109. Sawtooth oscillator 101 is also coupled to voltage proportioning circuit 1101. Voltage proportioning circuit 1101 is coupled to voltage holding circuit 1102 by couplings 1104, 1105, 1106 and 1111. Voltage holding circuit 1102 is coupled to comparator block 105 by coupling 1108. Voltage holding circuit 1102 is coupled to comparator block 106 by coupling 1109. Voltage holding circuit 1102 is coupled to comparator block 106A by coupling 1110. Voltage holding circuit 1102 is coupled to comparator blocks 105, 106 and 106A by coupling 1107. Comparator block 105 is coupled to output 114, and comparator block 106 is coupled to output 115. Comparator block 106A is coupled to output 122.

Back-EMF control signal 108 from control logic circuit 107 control the operation of sawtooth oscillator 101. Optional external control circuit 102 may, if present, be used to control the operation of sawtooth oscillator 101. Sawtooth oscillator 101 provides an output at coupling 1103 that increases linearly over the time between back-EMF signals. Voltage proportioning circuit 1101 proportionally adjusts the voltages of the linearly increasing output of sawtooth oscillator 101. These proportionally adjusted voltages, and, possibly, the unaltered signal from coupling 1103 are supplied to voltage holding circuits 1102. Based on control signal 117, voltage holding circuits 1102 holds certain voltages for comparison and allows other voltages to pass in real time for comparison. Control signal 117 causes voltage holding circuits 1102 to function as sample-and-hold circuits. The voltages held or passed for comparison by voltage holding circuits 1102 are applied to couplings 1107, 1108, 1109 and 1110. These voltages are compared by comparator blocks 105, 106 and 106A, producing outputs 114, 115 and 122.

Figure 12:
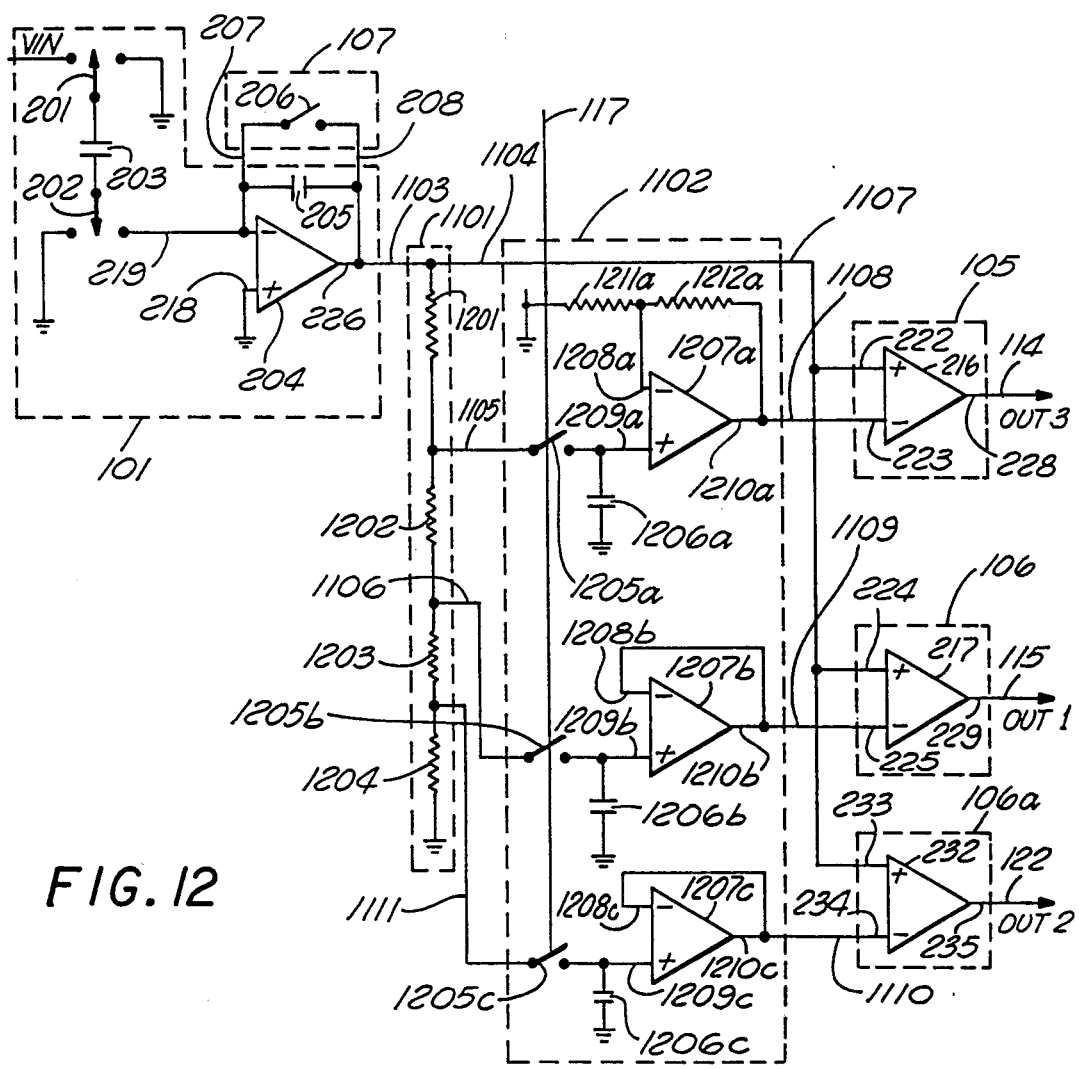
FIG. 12 is a schematic diagram illustrating still another alternate embodiment of the present invention.

A schematic diagram of a circuit based on the block diagram of FIG. 11 is illustrated in FIG. 12. FIG. 12 shows sawtooth oscillator 101 and comparator blocks 105, 106 and 106A implemented as in FIG. 2. These elements, along with back-EMF comparators 119 and optional external control circuit 102, may be implemented as in FIGS. 2, 3 or 4, or in any other suitable manner. As in FIG. 2, sawtooth oscillator 101 produces an output that increases linearly over the time between adjacent back-EMF pulses. This output is applied to coupling 1103. Coupling 1103 is coupled to the first terminal of resistor 1201, non-inverting input 222 of comparator 216, non-inverting input 224 of comparator 217 and non-inverting input 233 of comparator 232. The second terminal of resistor 1201 is coupled to the first terminal of resistor 1202 and to the first terminal of switch 1205A. The second terminal of resistor 1202 is coupled to the first terminal of resistor 1203 and to the first terminal of switch 1205B. The second terminal of resistor 1203 is coupled to the first terminal of resistor 1204 and to the first terminal of switch 1205C. The second terminal of resistor 1204 is coupled to ground. The second terminal of switch 1205A is coupled to the first terminal of capacitor 1206A and to non-inverting input 1209A of operational amplifier 1207A. The second terminal of capacitor 1206A is coupled to ground. Output 1210A of operational amplifier 1207A is coupled to the first terminal of resistor 1212A and to coupling 1108. The second terminal of resistor 1212A is coupled to the first terminal of resistor 1211A and inverting input 1208A of amplifier 1207A. The second terminal of resistor 1211A is coupled to ground. Coupling 1108 is coupled to inverting input 223 of comparator 216. Comparator 216 produces output 228 that is coupled to output 114. Switches 1205A, 1205B and 1205C are coupled to control signal 117.

The second terminal of switch 1205B is coupled to the first terminal of capacitor 1206B and to non-inverting input 1209B of operational amplifier 1207B. The second terminal of capacitor 1206B is coupled to ground. Output 1210B of operational amplifier 1207B is coupled to inverting input 1208B and to coupling 1109. Coupling 1109 is coupled to inverting input 225 of comparator 217. Comparator 217 produces output 229 that is coupled to output 115.

The second terminal of switch 1205C is coupled to the first terminal of capacitor 1206C and to non-inverting input 1209C of operational amplifier 1207C. The second terminal of capacitor 1206C is coupled to ground. Output 1210C of operational amplifier 1207C is coupled to inverting input 1208C and to coupling 1110. Coupling 1110 is coupled to inverting input 234 of comparator 232. Comparator 232 produces output 235 that is coupled to output 122.

The linearly increasing voltage present at coupling 1103 is proportionally reduced by voltage proportioing circuit 1101, which includes resistors 1201, 1202, 1203 and 1204. Voltage proportioning circuit 1101 produces proportionally reduced voltages at couplings 1105 and 1106, which are supplied to voltage holding circuit 1102.

Control signal 117 controls the operation of switch 1205A. Immediately prior to the closure of switch 206, control signal 117 closes switches 1205A, 1205B and 1205C to acquire the voltage on coupling 1103 onto capacitors 1206A, 1206B and 1206C. Control signal 117 is active long enough to completely charge these capacitors. Control 117 becomes non-active, opening switches 1205A, 1205B and 1205C, then control 108 activates switch 206. By its action, the peak voltage at coupling 1105 is stored on capacitor 1206A. Since non-inverting input 1209A of operational amplifier 1207A draws almost no current, capacitor 1206A remains at an essentially constant voltage while switch 1205A is open. Operational amplifier 1207A is configured as a low gain buffer amplifier ($A_v$ approximately 1.1), which produces a voltage at output 1210A greater than the voltage present at non-inverting input 1209A. Output 1210A is coupled to coupling 1108.

Control signal 117 also controls the operation of switch 1205B. By its action, the peak voltage at coupling 1106 is stored on capacitor 1206B. Since non-inverting input 1209B of operational amplifier 1207B draws almost no current, the voltage across capacitor 1206B remains at an essentially constant voltage while switch 1205B is open. Output 1210B of operational amplifier 1207B is coupled to inverting input 1208B. Operational amplifier 1207B is configured as a unity gain buffer amplifier, which produces a voltage at output 1210B equal to the voltage present at non-inverting input 1209B. Output 1210B is coupled to coupling 1109.

Control signal 117 also controls the operation of switch 1205C. By its action, the peak voltage at coupling 1111 is stored on capacitor 1206C. Since non-inverting input 1209C of operational amplifier 1207C draws almost no current, the voltage across capacitor 1206C remains at an essentially constant voltage while switch 1205C is open. Output 1210C of operational amplifier 1207C is coupled to inverting input 1208C. Operational amplifier 1207C is configured as a unity gain buffer amplifier, which produces a voltage at output 1210C equal to the voltage present at non-inverting input 1209C. Output 1210C is coupled to coupling 1110.

Coupling 1103 is coupled to coupling 1107 through coupling 1104. Coupling 1107 is coupled to non-inverting input 222 of comparator 216, to non-inverting input 224 of comparator 217 and to non-inverting input 233 of comparator 232. Coupling 1108 is coupled to inverting input 223 of comparator 216. When the voltage at coupling 1107 exceeds the voltage at coupling 1108, output 228 of comparator 216 changes state. Coupling 1109 is coupled to inverting input 225 of comparator 217. When the voltage at coupling 1107 exceeds the voltage at coupling 1109, output 229 of comparator 217 changes state. Coupling 1110 is coupled to inverting input 234 of comparator 232. When the voltage at coupling 1107 exceeds the voltage at coupling 1110, output 235 of comparator 232 changes state.

The linearly increasing voltage present at coupling 1107 represents the amount of time that has elapsed since the last back-EMF occurrence. The voltages present at couplings 1108, 1109 and 1110 represent fractions of the duration of the previous back-EMF cycle. The rotational inertia of the motor system assures that adjacent back-EMF cycles have approximately the same duration from one commutation period to the adjacent commutation period. As a result, outputs 114, 115 and 122 change state after a specified fraction of the present back-EMF cycle has elapsed. Thus, a circuit for providing adaptive commutation delays has been provided.

Figure 9:
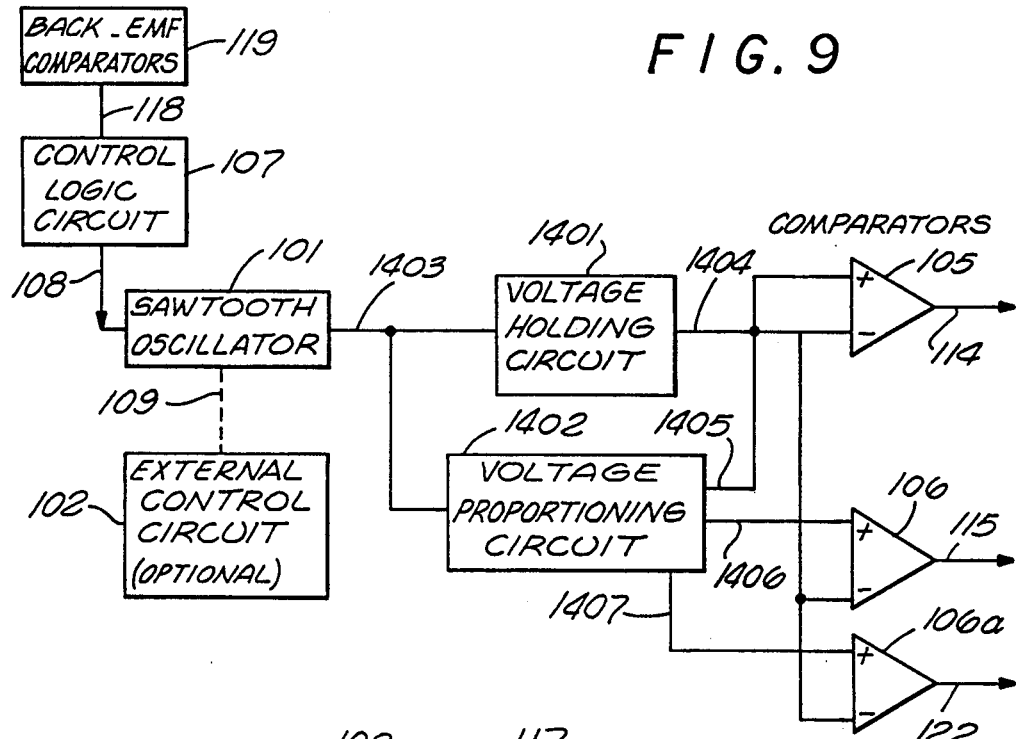
FIG. 9 is a block diagram illustrating yet another alternate embodiment of the present invention.

A block diagram of another alternate embodiment of the present invention is illustrated in FIG. 9. In FIG. 9, back-EMF comparators 119 provide signal 118 to control logic circuit 107. Control logic circuit 107 controls the operation of a sawtooth oscillator 101 (via control signal 108) and voltage holding circuit 1401 (via control signal 117). Optional external control circuit 102, if present, is coupled to sawtooth oscillator 101 by coupling 109. Sawtooth oscillator 101 is coupled to voltage holding circuit 1401 and voltage proportioning circuit 1402 is coupled to comparator 105 by coupling 1405, to comparator 106 by coupling 1406 and comparator 106A by coupling 1407. Comparator 105 produces output 114, comparator 106 produces output 115 and comparator 106A produces output 122. Signals from control logic circuit 107 control the operation of sawtooth oscillator 101. Optional external control circuit 102, if present, may also be used to control the operation of sawtooth oscillator 101. The output of sawtooth oscillator 101 is coupled to voltage holding circuit 1401 and voltage proportioning circuit 1402. Voltage holding circuit 1401 holds the peak value of the output of sawtooth oscillator 101 for each back-EMF cycle. Voltage proportioning circuit 1402 produces output voltages in proportion to the voltage of the output of sawtooth oscillator 101. The proportional voltage outputs of the voltage proportioning circuit are compared to the peak value of the output of sawtooth oscillator 101 for the previous back-EMF cycle. Comparators 105, 106 and 106A perform this comparison, producing outputs 114, 115 and 122.

Figure 10:
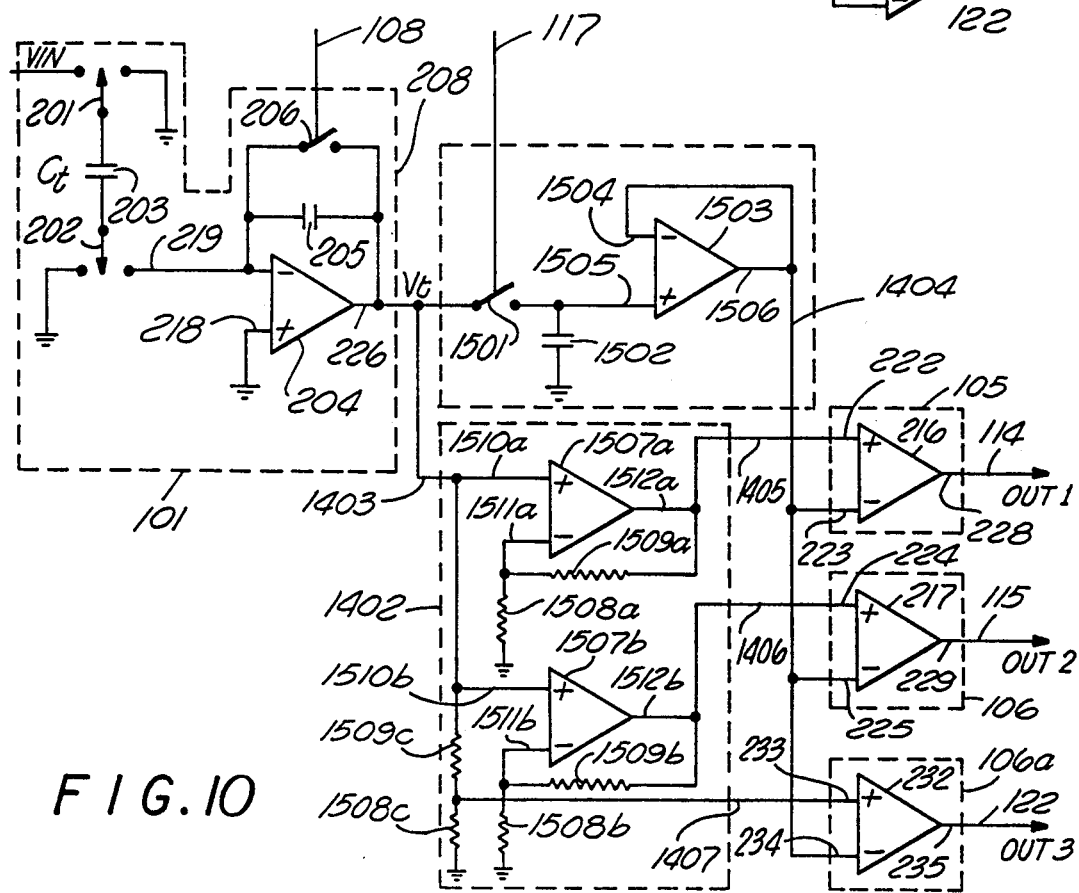
FIG. 10 is a schematic diagram illustrating an alternate embodiment of the present invention based on the block diagram of FIG. 9.

A schematic diagram of another alternate embodiment of the present invention based on the block diagram of FIG. 9 is illustrated in FIG. 10. Sawtooth oscillator 101 and comparators 105 and 106 of FIG. 10 are shown implemented using the same circuitry as in FIG. 2. These elements and optional external control circuit 102, if present, may be implemented using the circuits of FIGS. 2, 3 or 4, or any other suitable circuitry. Control signal 108 may be provided by the same circuitry as in FIG. 2. Control signal 117 provides a pulse at the appropriate time to cause voltage holding circuit 1401 to sample and hold the maximum voltage present at coupling 1403 over a back-EMF cycle.

Output 226 of sawtooth oscillator 101 is coupled to coupling 1403. Coupling 1403 is coupled to voltage holding circuit 1401 and voltage proportioning circuit 1402.

Voltage holding circuit 1401 includes switch 1501, capacitor 1502 and operational amplifier 1503. Voltage proportioning circuit 1402 includes operational amplifiers 1507A and 1507B and resistors 1508A, 1508B, 1508C, 1509A, 1509B and 1509C.

Coupling 1403 is coupled to the first terminal of switch 1501. The second terminal of switch 1501 is coupled to the first terminal of capacitor 1502 and to non-inverting input 1505 of operational amplifier 1503. The second terminal of capacitor 1502 is coupled to ground. Output 1506 of operational amplifier 1503 is coupled to inverting input 1504 and to coupling 1404. Switch 1501 is also coupled to control signal 117.

Coupling 1403 is also coupled to non-inverting input 1510A of operational amplifier 1507A and to non-inverting input 1510B of operational amplifier 1507B. Inverting input 1511A of operational amplifier 1507A is coupled to the first terminals of resistors 1508A and 1509A. The second terminal of resistor 1508A is coupled to ground. The second terminal of resistor 1509A is coupled to output 1512A of operational amplifier 1507A and to coupling 1405. Inverting input 1511B of operational amplifier 1507B is coupled to the first terminals of resistors 1508B and 1509B. The second terminal of resistor 1508B is coupled to ground. The second terminal of resistor 1509B is coupled to output 1512B of operational amplifier 1507B and to coupling 1406. Coupling 1403 is coupled to the first terminal of resistor 1509C. The second terminal of resistor 1509C is coupled to the first terminal of resistor 1508C. The second terminal of resistor 1508C is coupled to ground. The second terminal of resistor 1509C is coupled to coupling 1407.

Coupling 1404 is coupled to inverting input 223 of comparator 216, to inverting input 225 of comparator 217 and to inverting input 234 of comparator 232. Coupling 1405 is coupled to non-inverting input 222 of comparator 216. Coupling 1406 is coupled to non-inverting input 224 of comparator 217. Coupling 1407 is coupled to non-inverting input 233 of comparator 232. Comparator 216 produces output 228 which is coupled to output 114. Comparator 217 produces output 229 which is coupled to output 115. Comparator 232 produces output 235 which is coupled to output 122.

The output of sawtooth oscillator 101 is a voltage which increases linearly over the time between adjacent back-EMF signals. Control signal 117 controls the operation of switch 1501 such that block 1401 holds the peak value of 1403 during a cycle. Switch 1501 closes briefly upon either a back-EMF pulse (RAWCOMM of FIG. 8, e.g.) or a change of state of OUT3 in order to acquire the voltage at coupling 1403 and then opens to store the voltage on capacitor 1502. Since non-inverting input 1505 of operational amplifier 1503 draws almost no current, the voltage across capacitor 1502 remains essentially constant while switch 1501 remains open. Operational amplifier 1503 is configured as a unity gain follower, producing output 1506 equal to the voltage at non-inverting input 1505.

Operational amplifiers 1507A and 1507B are configured as non-inverting amplifiers, each producing a gain greater than one. The gain of operational amplifier 1507A is a function of the value of resistors 1508A and 1509A. The gain of operational amplifier 1507B is a function of the value of resistors 1508B and 1509B. Operational amplifiers 1507A and 1507B produce outputs at couplings 1405 and 1406 which are proportionally increased from the voltage at coupling 1403. Resistors 1508C and 1509C produce a voltage of coupling 1407 which is less than the value of 1403.

Comparator 216 compares the proportionally increased voltage at coupling 1405 to the peak value of the output of the sawtooth oscillator over the previous back-EMF cycle. When the proportionally increased voltage at coupling 1405 exceeds the stored value present at coupling 1404, output 228 of comparator 216 changes state. Comparator 217 compares the proportionally increased voltage present at coupling 1406 to the peak value of the output of the sawtooth oscillator over the previous back-EMF cycle present at coupling 1404. When the voltage at coupling 1406 exceeds the voltage at coupling 1404, output 229 of comparator 217 changes state. Comparator 232 compares the voltage at coupling 1407 to the peak value of the output of the sawtooth oscillator over the previous back-EMF cycle. When the voltage at coupling 1407 exceeds the stored value present at coupling 1404, output 235 of comparator 232 changes state.

The voltage at coupling 1404 represents the duration of the previous back-EMF cycle. The voltage at coupling 1403 represents the time elapsed in the current back-EMF cycle. By amplifying the voltage present at coupling 1403 using operational amplifiers 1507A and 1507B, the voltages at couplings 1405 and 1406 exceed the voltage at coupling 1404 after a time less than the duration of the previous back-EMF cycle has elapsed in the current back-EMF cycle. By adjusting the gain of operational amplifiers 1507A and 1507B, the fraction of the duration of the current back-EMF cycle at which comparators 216 and 217 change state may be adjusted. By the action of resistor divider 1508C and 1509C, the voltage at 1403 must exceed the voltage at 1404 by a fraction set by their values indicating that the time elapsed has exceeded that of the previous cycle. It is contemplated in the embodiment illustrated in FIGS. 9 and 10 that the voltages at couplings 1405, 1406 and 1407 can exceed the voltage at coupling 1404. Thus, a method for providing commutation delays that are adaptive to the rotational speed of a motor has been described.

Although the values of resistors (including resistors 212, 213, 214, 215, 230, 231, 712, 713, 714, 714A, 715, 715A, 826, 827, 828, 829, 831, 832, 1201, 1202, 1203, 1204, 1508A, 1508B, 1508C, 1509A, 1509B and 1509C) may have certain relationships (such as all resistors of a voltage divider being of equal value) as described above, the present invention may be practiced with resistors having values which are not so related. The relationship of the resistors may be chosen to optimize the overall performance of a motor control system. The values of the resistors may have any relationship which provides satisfactory performance without departing from the scope of the invention.

The present invention provides commutation delay for a multi-pole brushless DC motors which is adaptive to variations in the rotational speed of the motor without the need for complicated circuitry or components external to a single integrated circuit. Thus, a much more efficient, reliable and economical method of providing adaptive commutation delay has been provided.

We claim:

1. A circuit for providing commutation delay comprising:
    oscillating means for receiving an input and for providing a first output, wherein said first output varies substantially linearly over time for a portion of a cycle, said oscillating means comprises a sawtooth oscillator;
    voltage holding and attenuating means coupled to said first output, said voltage holding and attenuating means for providing a second output;
    comparing means coupled to said first output and to said second output for providing a third output.

2. The circuit of claim 1 wherein said input comprises a plurality of back-EMF pulses, said first output increasing linearly over time between two adjacent of said plurality of back-EMF pulses.

3. The circuit of claim 1 wherein said sawtooth oscillator comprises a current source and a capacitor.

4. The circuit of claim 3 wherein said current source comprises a switched capacitor current source.

5. The circuit of claim 1 wherein said oscillator comprises a current source, an operational amplifier, and a capacitor in a feedback loop of said operational amplifier.

6. The circuit of claim 1 wherein said oscillating means further comprises a power consumption reduction means, said power consumption reduction means for reducing the magnitude of the current into said oscillating means.

7. The circuit of claim 6 wherein said power consumption reduction means comprises a switch.

8. The circuit of claim 1 wherein said voltage holding and attenuating means comprises a voltage holding means coupled to said first output, said voltage holding means for providing a fourth output, and a voltage attenuating means coupled to said fourth output.

9. The circuit of claim 8 wherein said voltage holding means holds a peak output value of said first output for each of a plurality of cycles of said oscillating means.

10. The circuit of claim 8 wherein said second output is of a first voltage and said fourth output is of a second voltage, said first voltage being approximately equal to one-half of said second voltage.

11. The circuit of claim 8 wherein said third output is coupled to said voltage holding means for controlling said voltage holding means.

12. The circuit of claim 8 wherein said voltage holding means comprises:
a switch having a first terminal and a second terminal, said first terminal coupled to said first output and said second terminal coupled to a node;
a capacitor having a first terminal coupled to said node; and
an operational amplifier having a first terminal coupled to said node.

13. The circuit of claim 8 wherein said voltage attenuating means comprises a plurality of resistors.

14. The circuit of claim 8 wherein said voltage holding means comprises a track-and-hold circuit.

15. The circuit of claim 8 wherein said voltage holding means comprises a sample-and-hold circuit.

16. The circuit of claim 8 wherein said comparing means further comprises means for providing a fifth output.

17. The circuit of claim 16 wherein said fifth output is coupled to said voltage holding means for controlling said voltage holding means.

18. The circuit of claim 1 wherein said third output is coupled to said voltage holding and attenuating means for controlling said voltage holding and attenuating means.

19. The circuit of claim 1 wherein said comparing means further comprises means for providing a fifth output.

20. The circuit of claim 19 wherein said fifth output is coupled to said voltage holding and attenuating means for controlling said voltage holding and attenuating means.

21. The circuit of claim 1 wherein said comparing means provides an inhibit signal for inhibiting spurious signals present at said input.

22. The circuit of claim 1 wherein said oscillating means, said voltage holding and attenuating means, and said comparing means are incorporated into a single integrated circuit.

23. The circuit of claim 1 wherein a timing component for controlling said oscillating means is implemented as a discrete component.

24. The circuit of claim 1 wherein said voltage holding and attenuating means comprises a voltage attenuating means coupled to said first output, said voltage attenuating means for providing a fourth output, and a voltage holding means coupled to said fourth output.

25. The circuit of claim 24 wherein said fourth output is of a first voltage and said first output is of a second voltage, said first voltage being approximately equal to one-half of said second voltage.

26. The circuit of claim 24 wherein said voltage holding means holds a peak output value of said fourth output for each of a plurality of cycles of said oscillating means.

27. The circuit of claim 24 wherein said third output is coupled to said voltage holding means for controlling said voltage holding means.

28. The circuit of claim 24 wherein said voltage holding means comprises:
a switch having a first terminal and a second terminal, said first terminal coupled to said first output and said second terminal coupled to a node;
a capacitor having a first terminal coupled to said node; and
an operational amplifier having a first terminal coupled to said node.

29. The circuit of claim 24 wherein said voltage attenuating means comprises a plurality of resistors.

30. The circuit of claim 24 wherein said voltage holding means comprises a track-and-hold circuit.

31. The circuit of claim 24 wherein said voltage holding means comprises a sample-and-hold circuit.

32. The circuit of claim 24 wherein said comparing means further comprises means for providing a fifth output.

33. The circuit of claim 32 wherein said fifth output is coupled to said voltage holding means for controlling said voltage holding means.

34. A circuit for providing commutation delay comprising:
oscillating means for receiving an input and for providing a first output, wherein said first output varies substantially linearly over time for a portion of a cycle, said oscillating means comprises a sawtooth oscillator;
voltage holding means coupled to said first output, said voltage holding means for providing a second output;
amplifying means coupled to said first output, said amplifying means for providing a third output;
comparing means coupled to said second and third outputs, said comparing means for providing a fourth output.

35. The circuit of claim 34 wherein said input comprises a plurality of back-EMF pulses, said first output increasing linearly over time between two adjacent of said plurality of back-EMF pulses.

36. The circuit of claim 34 wherein said sawtooth oscillator comprises a current source and a capacitor.

37. The circuit of claim 36 wherein said current source comprises a switched capacitor current source.

38. The circuit of claim 34 wherein said sawtooth oscillator comprises a current source, an operational amplifier, and a capacitor in a feedback loop of said operational amplifier.

39. The circuit of claim 34 wherein said oscillating means further comprises a power consumption reduction means, said power consumption reduction means for reducing the magnitude of the current into said oscillating means.

40. The circuit of claim 39 wherein said power consumption reduction means comprises a switch.

41. The circuit of claim 34 wherein said voltage holding means holds a peak output value of said first output for each of a plurality of cycles of said oscillating means.

42. The circuit of claim 34 wherein said third output is of a first voltage and said first output is of a second voltage, said first voltage being approximately equal to twice said second voltage.

43. The circuit of claim 34 wherein said fourth output is coupled to said voltage holding means for controlling said voltage holding means.

44. The circuit of claim 34 wherein said comparing means provides an inhibit signal for inhibiting spurious signals present at said input.

45. The circuit of claim 34 wherein said oscillating means, said voltage holding means, said amplifying means and said comparing means are incorporated into a single integrated circuit.

46. The circuit of claim 34 wherein a timing component for controlling said oscillating means is implemented as a discrete component.

47. The circuit of claim 34 wherein said voltage holding means comprises:
  a switch having a first terminal and a second terminal, said first terminal coupled to said first output and said second terminal coupled to a node;
  a capacitor having a first terminal coupled to said node; and
  an operational amplifier having a first terminal coupled to said node.

48. The circuit of claim 34 wherein said amplifying means comprises an operational amplifier and two resistors.

49. The circuit of claim 34 wherein said voltage holding means comprises a track-and-hold circuit.

50. The circuit of claim 34 wherein said voltage holding means comprises a sample-and-hold circuit.

51. A method for providing commutation delay comprising the steps of:
  detecting a back-EMF pulse;
  producing a voltage proportional to the time elapsed since the back-EMF pulse occurred;
  holding a peak value of said voltage;
  proportionally reducing said peak value of said voltage to produce a proportionally reduced peak value of said voltage;
  comparing said voltage to said proportionally reduced peak value of said voltage; and
  producing a delayed commutation signal.

52. The method of claim 51 wherein said peak value of said voltage is proportionally reduced to approximately one-half of said peak value of said voltage.

53. A method for providing commutation delay comprising the steps of:
  detecting a back-EMF pulse;
  producing a voltage proportional to the time elapsed since the back-EMF pulse occurred;
  proportionally reducing said voltage to produce a proportionally reduced voltage;
  holding a peak value of said proportionally reduced voltage;
  comparing said voltage to said peak value of said proportionally reduced voltage; and
  producing a delayed commutation signal.

54. The method of claim 53 wherein said voltage is proportionally reduced to approximately one-half of said voltage.

55. A method for providing commutation delay comprising the steps of:
  detecting a back-EMF pulse;
  producing a voltage proportional to the time elapsed since the back-EMF pulse occurred;
  holding a peak value of said voltage;
  proportionally increasing said voltage to produce a proportionally increased voltage;
  comparing said proportionally increased voltage to said peak value of said voltage; and
  producing a delayed commutation signal.

56. The method of claim 55 wherein said voltage is proportionally increased to approximately twice said voltage.

* * * * *